US012305028B2

(12) United States Patent
Bai et al.

(10) Patent No.: US 12,305,028 B2
(45) Date of Patent: May 20, 2025

(54) HIGH PROPYLENE CONTENT EP HAVING LOW GLASS TRANSITION TEMPERATURES

(71) Applicant: ExxonMobil Chemical Patents Inc., Baytown, TX (US)

(72) Inventors: Zhifeng Bai, Houston, TX (US); Jo Ann M. Canich, Houston, TX (US); Jingwen Zhang, Houston, TX (US); Peijun Jiang, Katy, TX (US); Adrian Garcia Barry, Houston, TX (US); Chase A. Eckert, Houston, TX (US); Sarah J. Mattler, League City, TX (US)

(73) Assignee: ExxonMobil Engineering & Technology Company, Baytown, TX (US)

( * ) Notice: Subject to any disclaimer, the term of this patent is extended or adjusted under 35 U.S.C. 154(b) by 646 days.

(21) Appl. No.: 17/626,601

(22) PCT Filed: Jul. 17, 2020

(86) PCT No.: PCT/US2020/042597
§ 371 (c)(1),
(2) Date: Jan. 12, 2022

(87) PCT Pub. No.: WO2021/011892
PCT Pub. Date: Jan. 21, 2021

(65) Prior Publication Data
US 2022/0251361 A1 Aug. 11, 2022

Related U.S. Application Data

(60) Provisional application No. 62/875,196, filed on Jul. 17, 2019.

(51) Int. Cl.
| | | |
|---|---|---|
| C08F 210/16 | (2006.01) | |
| B60C 1/00 | (2006.01) | |
| C08F 4/602 | (2006.01) | |
| C08F 4/64 | (2006.01) | |
| C08F 4/6592 | (2006.01) | |
| C08F 210/02 | (2006.01) | |
| C08F 210/06 | (2006.01) | |
| C08J 3/22 | (2006.01) | |
| C08J 3/24 | (2006.01) | |
| C08K 5/01 | (2006.01) | |
| C08L 7/00 | (2006.01) | |
| C08L 9/00 | (2006.01) | |
| C08L 23/16 | (2006.01) | |
| C08L 23/22 | (2006.01) | |
| C08L 23/283 | (2025.01) | |
| C09J 123/16 | (2006.01) | |

(52) U.S. Cl.
CPC ............ *C08L 23/16* (2013.01); *B60C 1/0008* (2013.01); *B60C 1/0025* (2013.01); *C08F 4/6028* (2013.01); *C08F 4/6592* (2013.01); *C08F 210/02* (2013.01); *C08F 210/06* (2013.01); *C08J 3/22* (2013.01); *C08J 3/24* (2013.01); *C08K 5/01* (2013.01); *C08L 7/00* (2013.01); *C08L 9/00* (2013.01); *C08L 23/22* (2013.01); *C08L 23/283* (2013.01); *C09J 123/16* (2013.01); *C08F 210/16* (2013.01); *C08L 2205/02* (2013.01); *C08L 2205/025* (2013.01); *C08L 2205/03* (2013.01); *C08L 2312/00* (2013.01); *C08L 2314/06* (2013.01); *C09J 2423/16* (2013.01); *C09J 2467/006* (2013.01)

(58) Field of Classification Search
CPC .............. C08F 210/16; C08F 2500/32; C08F 4/6592; C08F 2420/02
See application file for complete search history.

(56) References Cited

U.S. PATENT DOCUMENTS

| | | | |
|---|---|---|---|
| 4,701,432 A | 10/1987 | Welborn, Jr. | |
| 5,077,255 A | 12/1991 | Welborn, Jr. | |
| 5,135,526 A | 8/1992 | Zinnanti et al. | |
| 5,382,630 A | 1/1995 | Stehling et al. | |
| 5,382,631 A | 1/1995 | Stehling et al. | |
| 5,516,848 A | 5/1996 | Canich et al. | |
| 5,965,756 A * | 10/1999 | McAdon .................. | C08F 10/00 502/103 |
| 6,069,213 A | 5/2000 | Memzek et al. | |
| 6,169,151 B1 | 1/2001 | Waymouth et al. | |
| 6,207,606 B1 | 3/2001 | Lue et al. | |
| 6,420,507 B1 | 7/2002 | Kale et al. | |
| 6,613,713 B2 | 9/2003 | Becke et al. | |
| 6,656,866 B2 | 12/2003 | Wenzel et al. | |
| 6,664,348 B2 | 12/2003 | Speca | |
| 6,846,770 B2 | 1/2005 | Speca | |
| 7,087,773 B2 * | 8/2006 | Graf ....................... | C07F 17/00 502/103 |
| 7,141,632 B2 | 11/2006 | Vaughan et al. | |

(Continued)

FOREIGN PATENT DOCUMENTS

| | | |
|---|---|---|
| WO | 98/27103 | 6/1998 |
| WO | 2000/12565 | 3/2000 |
| WO | 2001/42315 | 6/2001 |
| WO | 2002/060957 | 8/2002 |
| WO | 2004/013149 | 2/2004 |
| WO | 2004/046214 | 6/2004 |
| WO | 2007/080365 | 7/2007 |
| WO | 2012/006272 | 1/2012 |
| WO | 2016/053541 | 4/2016 |
| WO | 2016/053542 | 4/2016 |
| WO | 2016/114914 | 7/2016 |
| WO | 2016/114915 | 7/2016 |
| WO | 2017/034680 | 3/2017 |
| WO | WO-2017192226 A1 * | 11/2017 ........... B01J 31/2295 |

(Continued)

*Primary Examiner* — Rip A Lee

(57) ABSTRACT

The present disclosure provides methods for producing an olefin polymer by contacting a $C_3$-$C_{40}$ olefin and ethylene with a catalyst system including an activator and a metallocene catalyst compound comprising a substituted or unsubstituted tetrahydro-s-indacenyl group and obtaining a $C_3$-$C_{40}$ olefin-ethylene copolymer typically comprising from 0.5 to 43 wt % ethylene, and from 99.5 to 57 wt % $C_3$ to $C_{40}$ comonomer wherein the Tg of the terpolymer is from 0 to −60° C.

24 Claims, 3 Drawing Sheets

(56) References Cited

U.S. PATENT DOCUMENTS

| | | |
|---|---|---|
| 7,192,902 B2 | 3/2007 | Brinen et al. |
| 7,355,058 B2 | 4/2008 | Luo et al. |
| 7,385,015 B2 | 6/2008 | Holtcamp |
| 8,088,867 B2 | 1/2012 | Jiang et al. |
| 8,110,518 B2 | 2/2012 | Marin et al. |
| 8,575,284 B2 | 11/2013 | Luo et al. |
| 8,598,061 B2 | 12/2013 | Yang et al. |
| 8,815,357 B1 | 8/2014 | Inn et al. |
| 8,865,848 B2 * | 10/2014 | Castro ............... C08F 210/16 502/103 |
| 8,933,256 B2 * | 1/2015 | Castro ............... C08F 4/65912 502/103 |
| 9,458,254 B2 | 10/2016 | Canich et al. |
| 9,796,795 B2 | 10/2017 | Canich et al. |
| 9,803,037 B1 | 10/2017 | Canich et al. |
| 10,081,686 B2 * | 9/2018 | Resconi ............... B01J 35/50 |
| 10,538,656 B2 | 1/2020 | Canich et al. |
| 10,808,049 B2 | 10/2020 | Rix et al. |
| 10,822,440 B2 | 11/2020 | Tsou et al. |
| 10,889,663 B2 | 1/2021 | Yang et al. |
| 10,894,841 B2 | 1/2021 | Canich et al. |
| 10,899,853 B2 | 1/2021 | Canich et al. |
| 11,001,657 B2 | 5/2021 | Yang et al. |
| 11,053,329 B2 | 7/2021 | Shah et al. |
| 11,053,381 B2 | 7/2021 | Dharmarajan et al. |
| 11,214,631 B2 | 1/2022 | Yang et al. |
| 11,299,567 B2 | 4/2022 | Zhang et al. |
| 11,345,766 B2 | 5/2022 | Canich et al. |
| 11,542,346 B2 * | 1/2023 | Izmer ............... C07F 17/02 |
| 11,766,669 B2 * | 9/2023 | Canich ............... C08F 4/6592 502/155 |
| 2002/0007023 A1 | 1/2002 | McDaniel et al. |
| 2005/0075525 A1 | 4/2005 | Chang et al. |
| 2005/0288461 A1 | 12/2005 | Jensen et al. |
| 2009/0105407 A1 | 4/2009 | Karjala et al. |
| 2010/0256427 A1 | 10/2010 | Karjala et al. |
| 2014/0031504 A1 | 1/2014 | Jacobsen et al. |
| 2014/0088214 A1 | 3/2014 | Okamoto et al. |
| 2016/0244535 A1 | 8/2016 | Canich et al. |
| 2017/0342175 A1 | 11/2017 | Hagadorn et al. |
| 2017/0362350 A1 | 12/2017 | Canich et al. |
| 2018/0002517 A1 | 1/2018 | Canich et al. |
| 2018/0002616 A1 | 1/2018 | Kumar et al. |
| 2018/0094088 A1 | 4/2018 | Crowther et al. |
| 2018/0134828 A1 | 5/2018 | Doufas et al. |
| 2018/0171040 A1 | 6/2018 | Ye et al. |
| 2019/0169322 A1 | 6/2019 | Rix et al. |
| 2019/0284311 A1 * | 9/2019 | Canich ............... B60C 1/0025 |
| 2019/0284318 A1 * | 9/2019 | Canich ............... C08F 2/38 |
| 2019/0284319 A1 * | 9/2019 | Shah ............... C08F 4/65912 |

FOREIGN PATENT DOCUMENTS

| | | | |
|---|---|---|---|
| WO | WO-2019182968 A1 * | 9/2019 | ........... B60C 1/0016 |
| WO | WO-2019182979 A1 * | 9/2019 | ........... B60C 1/0016 |
| WO | 2021/011883 | 1/2021 | |

* cited by examiner

HIGH PROPYLENE CONTENT EP HAVING LOW GLASS TRANSITION TEMPERATURES

CROSS REFERENCE TO RELATED APPLICATIONS

This application is a U.S. national phase application of PCT Application No. PCT/US2020/042597 having a filing date of Jul. 17, 2020, which claims priority to and the benefit of U.S. Provisional Application Ser. No. 62/875,196 having a filing date of Jul. 17, 2019, the contents of both of which are incorporated by reference in their entirety.

FIELD

The present disclosure provides catalyst systems and methods for producing $C_{3+}$ olefin-ethylene polymers.

BACKGROUND

Olefin polymerization catalysts are of great use in industry. Hence, there is interest in finding new catalyst systems that increase the commercial usefulness of the catalyst and allow the production of polymers having improved properties.

Catalysts for olefin polymerization are often based on cyclopentadienyl transition metal compounds as catalyst precursors, which are activated either with an alumoxane or with an activator containing a non-coordinating anion. A typical catalyst system includes a metallocene catalyst and an activator, and an optional support. Many metallocene catalyst systems can be used in homogeneous polymerizations (such as solution or supercritical) and supported catalyst systems are used in many polymerization processes, often in slurry or gas phase polymerization processes.

WO 2004/013149 A1 discloses group 4 metal constrained geometry complexes of tricyclic 4-aryl substituted indenyl ligands, esp. 1,5,6,7-tetrahydro-4-aryl-s-indacen-1-yl ligands, where the tetrahydro-s-indacene is substituted in the 4 position with a $C_{6-12}$ aryl group, and is preferably not substituted in the 5, 6, or 7 position, and if substituted in the 5, 6, or 7 position, is substituted by at most only one substituent at each position.

U.S. Pat. No. 6,420,507 discloses substituted tetrahydro-s-indacenyl transition metal complexes (such as Examples H to N), where the tetrahydro-s-indacene is not substituted at the 5, 6, or 7 position and is substituted at the 2 and/or 3 position.

EP 1 120 424 (and family member U.S. Pat. No. 6,613,713) disclose tert-butylamino-2-(5,6,7-tetrahydro-s-indacenyldimethylsilyl) titanium dichloride indenyl ligands as polymerization catalyst where the tetrahydro-s-indacene is not substituted at the 5, 6, or 7 position.

WO 2001/042315 discloses dimethylsilylene(t-butylamido)(2-methyl-tetrahydro-s-indacenyl)Ti(CH$_2$SiMe$_3$)$_2$ (see examples 27 and 28, and compounds IB5 and IB5' in claim 21) as polymerization catalysts where the tetrahydro-s-indacene is not substituted at the 5, 6, or 7 position.

WO 98/27103 discloses dimethylsilylene(t-butylamido)(2-methyl-tetrahydro-s-indacenyl)TiCl$_2$ (see example 1) and others as polymerization catalysts where the tetrahydro-s-indacene is not substituted at the 5, 6, or 7 position.

U.S. Pat. No. 9,803,037 discloses substituted tetrahydro-as-indacenes and a method to produce substituted or unsubstituted tetrahydro-as-indacenes.

US 2016/0244535 discloses monocyclopentadienyl transition metal compounds comprising a tetrahydroindacenyl group (such as tetrahydro-s-indacenyl or tetrahydro-as-indacenyl).

Other references of interest include: US 2016/0244535; US2017/0362350; WO 2017/034680; WO 2016/53541; WO 2016/53542; WO 2016/114915; U.S. Pat. Nos. 5,382,630; 5,382,631; 8,575,284; 6,069,213; 6,656,866; 8,815,357; US 2014/0031504; U.S. Pat. Nos. 5,135,526; 7,385,015; WO 2007/080365; WO 2012/006272; WO 00/12565; WO 02/060957; WO 2004/046214; U.S. Pat. Nos. 6,846,770; 6,664,348; U.S. Ser. No. 05/075,525; US 2002/007023; WO 2003/025027; US 2005/0288461; US 2014/0031504; U.S. Pat. Nos. 8,088,867; 5,516,848; 4,701,432; 5,077,255; 7,141,632; 6,207,606; 8,598,061; 7,192,902; 8,110,518; 7355058; US 2018/171040; US 2018/134828; U.S. Pat. No. 9,803,037; U.S. Ser. No. 16/098,592, filed Mar. 31, 2017; Ser. No. 16/266,186, filed Feb. 4, 2019; US 2018/002616; US 2018/002517; US 2017/360237; U.S. Ser. No. 16/315,090, filed Jan. 3, 2019; U.S. Ser. No. 16/315,294, filed Jan. 4, 2019; U.S. Ser. No. 16/315,722, filed Jan. 7, 2019; U.S. Ser. No. 16/315,874, filed Jan. 7, 2019; WO 2016/114914; U.S. Pat. No. 9,458,254; US 2018/0094088; WO 2017/204830; US 2017/0342175; U.S. Ser. No. 16/192,493, filed Nov. 15, 2018; U.S. Ser. No. 16/182,856, filed Nov. 7, 2018; U.S. Ser. No. 16/153,256, filed Oct. 5, 2018; and U.S. Pat. No. 9,796,795.

There is a need for new and improved catalyst systems for the polymerization of propylene-ethylene copolymers and methods for producing propylene-ethylene copolymers capable of increased activity while maintaining or improving other polymer properties, as compared to conventional catalyst systems and methods that produce propylene-ethylene copolymers. In addition, there is a need for new propylene-ethylene copolymers having low glass transition temperatures.

SUMMARY

The present disclosure provides methods for producing an olefin polymer by contacting $C_{3+}$ olefin (such as propylene) and ethylene with a catalyst system including an activator and a catalyst compound represented by formula (I):

$$T_y Cp'_m MG_n X_q \qquad (I)$$

wherein:
Cp' is a tetrahydroindacenyl group (such as tetrahydro-s-indacenyl or tetrahydro-as-indacenyl) which is optionally substituted or unsubstituted, provided that when Cp' is tetrahydro-s-indacenyl: 1) the 3 and/or 4 positions are not aryl or substituted aryl, 2) the 3 position is not directly bonded to a group 15 or 16 heteroatom, 3) there are no additional rings fused to the tetrahydroindacenyl ligand, 4) T is not bonded to the 2-position, and 5) the 5, 6, or 7-position (preferably the 6 position) is geminally disubstituted, preferably with two $C_1$-$C_{10}$ alkyl groups; M is a group 3, 4, 5, or 6 transition metal, preferably group 4 transition metal, for example titanium, zirconium, or hafnium;
T is a bridging group;
y is 0 or 1, indicating the absence or presence of T;
G is a heteroatom group represented by the formula JR$^i_{z-y}$ where J is N, P, O or S, R$^i$ is a $C_1$ to $C_{100}$ hydrocarbyl group, and z is 2 when J is N or P, and z is 1 when J is O or S;

X is a leaving group;

m=1; n=1, 2 or 3; q=1, 2 or 3; and the sum of m+n+q is equal to the oxidation state of the transition metal (preferably 2, 3, 4, 5, or 6, preferably 4); and obtaining a $C_{3+}$-olefin-ethylene polymer (such as $C_3$-$C_{40}$-olefin-ethylene copolymer) comprising from 0.5 to 43 wt % ethylene, from 99.5 to 57 wt % $C_{3+}$ olefin comonomer (such as $C_3$ to $C_{40}$ comonomer).

The present disclosure further provides a polymer obtained by a method of the present disclosure, the polymer having a crystallinity less than 3%; a melt flow rate (at 230° C., 2.16 kg) from 0.2 to 2000 g/10 min; a glass transition temperature from 0 to −60° C.

This disclosure further relates to novel $C_{3+}$-olefin-ethylene polymer (such as $C_3$-$C_{40}$-olefin-ethylene copolymer) comprising from 0.5 to 43 wt % ethylene, and from 99.5 to 57 wt % $C_{3+}$ olefin (such as $C_3$ to $C_{40}$ olefin), and having a polymer crystallinity of less than 3%; a melt flow rate (at 230° C., 2.16 kg) from 0.2 to 2000 g/10 min; a glass transition temperature from 0 to −60° C.

This disclosure further relates to novel propylene-ethylene polymer comprising from 0.5 to 43 wt % ethylene, and from 99.5 to 57 wt % $C_{3+}$ olefin (such as $C_3$ to $C_{40}$ olefin), and having a polymer crystallinity of less than 3%; a melt flow rate (at 230° C., 2.16 kg) from 0.2 to 2000 g/10 min; a glass transition temperature from 0 to −60° C.

This invention further relates to novel $C_{3+}$-olefin-ethylene polymer (such as $C_3$-$C_{40}$-olefin-ethylene copolymer) comprising 0.5 to 43 wt % ethylene, and from 99.5 to 57 wt % $C_{3+}$ olefin (such as $C_3$ to $C_{40}$ olefin), and having a $T_g$ (° C.) greater than or equal to −8.4295−1.2019*E and less than or equal to 0.5705−1.2019*E, wherein E is the weight fraction of ethylene in the polymer measured by FTIR.

DETAILED DESCRIPTION

Definitions

Figure 1:
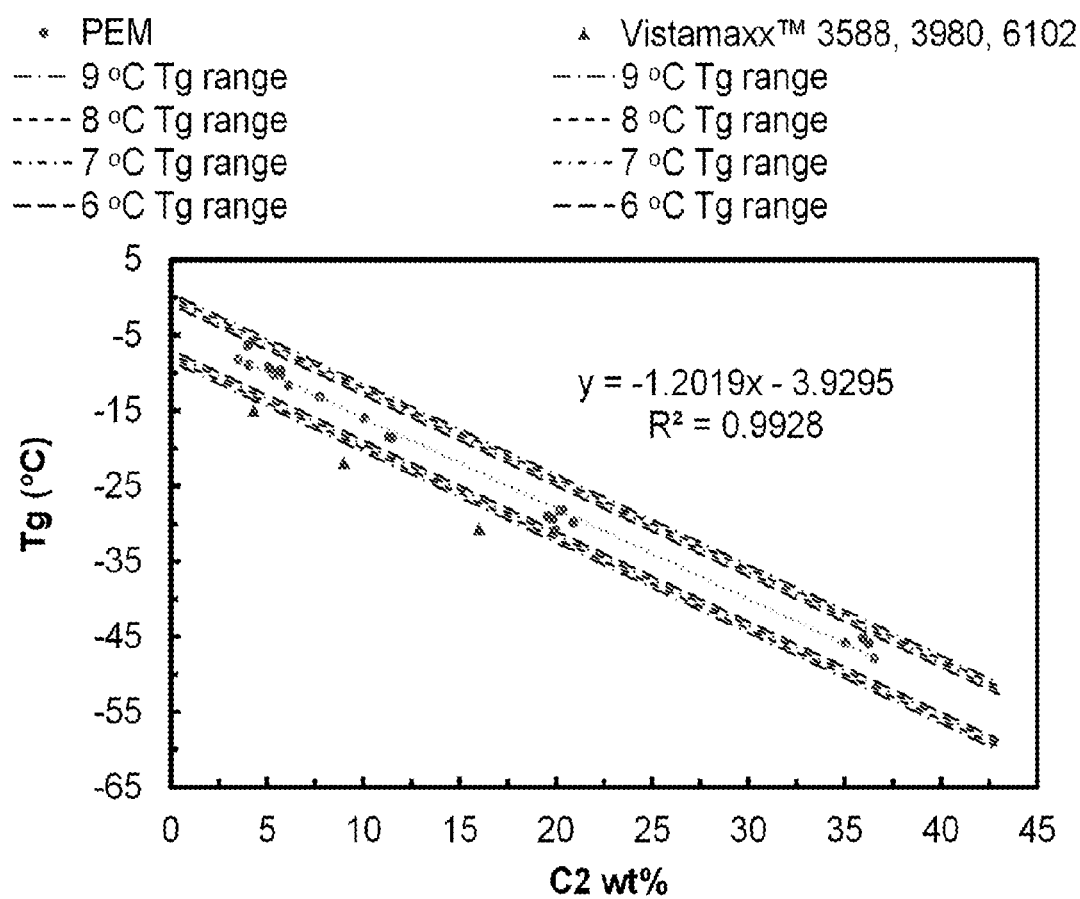
FIG. 1 is a plot of the wt % ethylene vs. polymer Tg (° C.) for propylene-ethylene copolymers (PEM) from Examples 7-29 as compared to commercial Vistamaxx™ performance polymer grades.
Figure 2:
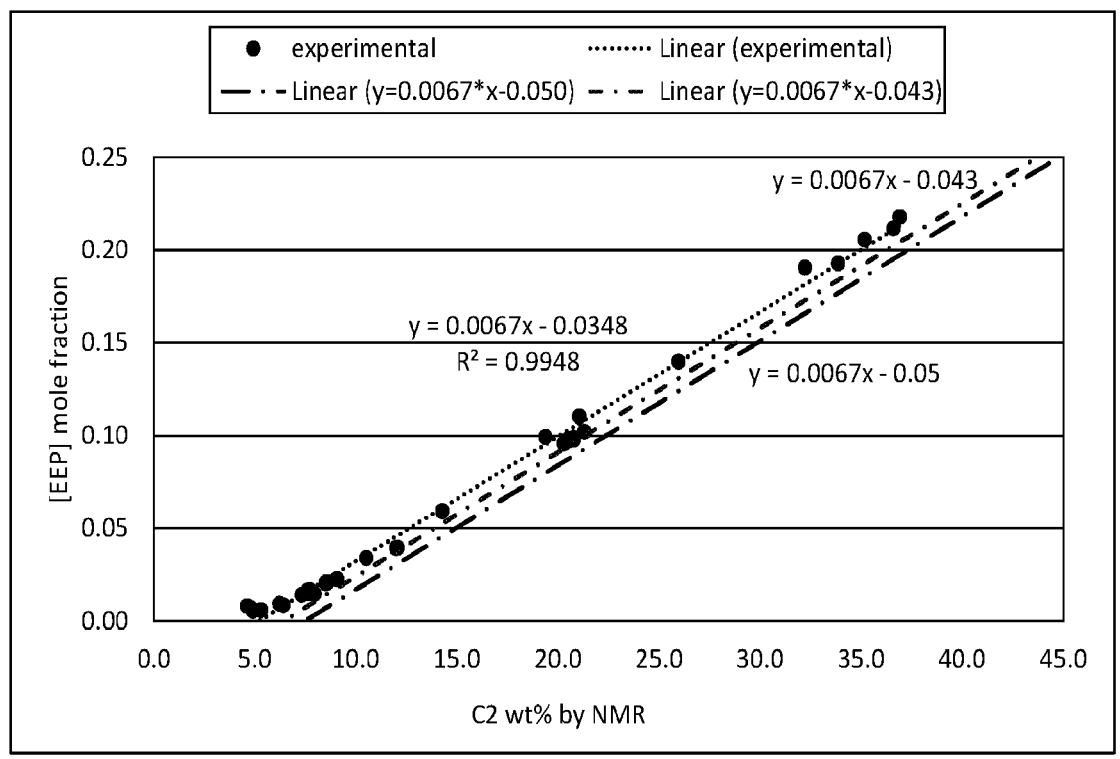
FIG. 2 is a plot of the wt % ethylene vs. the [EEP] mole fraction from $^{13}$C NMR for PEM copolymers of the invention.
Figure 3:
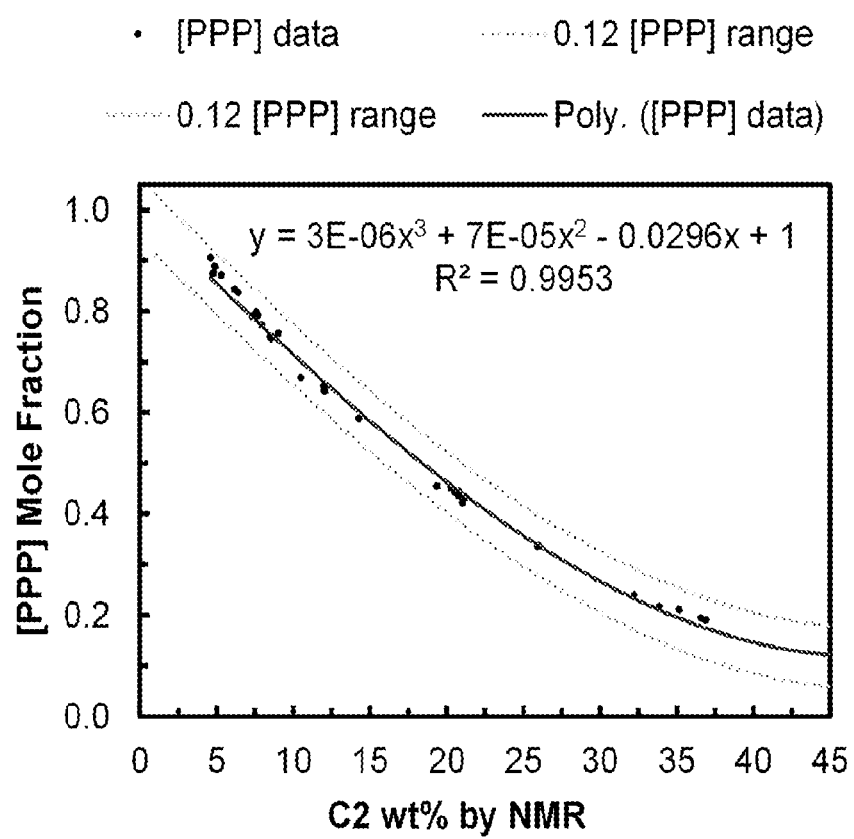
FIG. 3 is a plot of the wt % ethylene vs. the [PPP] mole fraction from $^{13}$C NMR for PEM copolymers.

For the purposes of the present disclosure, the numbering scheme for the Periodic Table groups is used as described in CHEMICAL AND ENGINEERING NEWS, 63(5), pg. 27 (1985), e.g., a "group 4 metal" is an element from group 4 of the Periodic Table, e.g. Hf, Ti, or Zr.

An "olefin," alternatively referred to as "alkene," is a linear, branched, or cyclic compound of carbon and hydrogen having at least one carbon-carbon double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt. % to 55 wt. %, it is understood that the mer unit in the copolymer is derived from ethylene in the polymerization reaction and said derived units are present at 35 wt. % to 55 wt. %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three or more mer units that are different from each other. "Different" as used to refer to mer units indicates that the mer units differ from each other by at least one atom or are different isomerically. Accordingly, the definition of copolymer, as used herein, includes terpolymers and the like. An "ethylene polymer" or "ethylene copolymer" is a polymer or copolymer comprising at least 50 mol % ethylene derived units, a "propylene polymer" or "propylene copolymer" is a polymer or copolymer comprising at least 50 mol % propylene derived units, and so on.

For the purposes of the present disclosure, ethylene shall be considered an α-olefin.

The terms "hydrocarbyl radical," "hydrocarbyl" and "hydrocarbyl group" are used interchangeably throughout this document. Likewise the terms "group", "radical", and "substituent" are also used interchangeably in this document. For purposes of this disclosure, "hydrocarbyl radical" is defined to be a radical, which contains hydrogen atoms and up to 50 carbon atoms and which may be linear, branched, or cyclic, and when cyclic, aromatic or non-aromatic.

Substituted hydrocarbyl radicals are radicals in which at least one hydrogen atom has been replaced with at least one functional group, such as $NR^x_2$, $OR^x$, $SeR^x$, $TeR^x$, $PR^x_2$, $AsR^x_2$, $SbR^x_2$, $SR^x$, $BR^x$ and the like or where at least one non-hydrocarbon atom or group has been inserted within the hydrocarbyl radical, such as —O—, —S—, —Se—, —Te—, —N($R^x$)—, =N—, —P($R^x$)—, =P—, —As($R^x$)—, =As—, —Sb($R^x$)—, =Sb—, —B($R^x$)—, =B— and the like, where $R^x$ is independently a hydrocarbyl or halocarbyl radical, and two or more $R^x$ may join together to form a substituted or unsubstituted saturated, partially unsaturated or aromatic cyclic or polycyclic ring structure. Examples of substituted hydrocarbyl include —CH$_2$CH$_2$—O—CH$_3$ and —CH$_2$—NMe$_2$ where the radical is bonded via the carbon atom, but would not include groups where the radical is bonded through the heteroatom such as —OCH$_2$CH$_3$ or —NMe$_2$.

Silylcarbyl radicals are radicals in which one or more hydrocarbyl hydrogen atoms have been substituted with at least one SiR*$_3$ containing group or where at least one —Si(R*)$_2$— has been inserted within the hydrocarbyl radical where R* is independently a hydrocarbyl or halocarbyl radical, and two or more R* may join together to form a substituted or unsubstituted saturated, partially unsaturated or aromatic cyclic or polycyclic ring structure.

Substituted silylcarbyl radicals are radicals in which at least one hydrogen atom has been substituted with at least one functional group such as —NR*$_2$, —OR*, —SeR*, —TeR*, —PR*$_2$, —AsR*$_2$, —SbR*$_2$, —SR*, —BR*$_2$, —GeR*$_3$, —SnR*$_3$, —PbR*$_3$ and the like or where at least one non-hydrocarbon atom or group has been inserted within the silylcarbyl radical, such as —O—, —S—, —Se—, —Te—, —N(R*)—, =N—, —P(R*)—, =P—, —As(R*)—, =As—, —Sb(R*)—, =Sb—, —B(R*)—, =B—, —Ge(R*)$_2$—, —Sn(R*)$_2$—, —Pb(R*)$_2$— and the like, where R* is independently a hydrocarbyl or halocarbyl radical, and two or more R* may join together to form a substituted or unsubstituted saturated, partially unsaturated or aromatic cyclic or polycyclic ring structure. Substituted silylcarbyl radicals are only bonded via a carbon or silicon atom.

Germylcarbyl radicals are radicals in which one or more hydrocarbyl hydrogen atoms have been substituted with at least one GeR*$_3$ containing group or where at least one —Ge(R*)$_2$— has been inserted within the hydrocarbyl radical where R* is independently a hydrocarbyl or halocarbyl radical, and two or more R* may join together to form a substituted or unsubstituted saturated, partially unsaturated or aromatic cyclic or polycyclic ring structure. Substituted germylcarbyl radicals are only bonded via a carbon or germanium atom.

Substituted germylcarbyl radicals are radicals in which at least one hydrogen atom has been substituted with at least one functional group such as —NR*$_2$, —OR*, —SeR*, —TeR*, —PR*$_2$, —AsR*$_2$, —SbR*$_2$, —SR*, —BR*$_2$, —SiR*$_3$, —SnR*$_3$, —PbR*$_3$ and the like or where at least one non-hydrocarbon atom or group has been inserted within the germylcarbyl radical, such as —O—, —S—, —Se—, —Te—, —N(R*)—, =N—, —P(R*)—, =P—, —As(R*)—, =As—, —Sb(R*)—, =Sb—, —B(R*)—, =B—, —Si(R*)$_2$—, —Sn(R*)$_2$—, —Pb(R*)$_2$— and the like, where R* is independently a hydrocarbyl or halocarbyl radical, and two or more R* may join together to form a substituted or unsubstituted saturated, partially unsaturated or aromatic cyclic or polycyclic ring structure.

Halocarbyl radicals are radicals in which one or more hydrocarbyl hydrogen atoms have been substituted with at least one halogen (e.g. F, Cl, Br, I) or halogen-containing group (e.g. CF$_3$).

Substituted halocarbyl radicals are radicals in which at least one halocarbyl hydrogen or halogen atom has been substituted with at least one functional group such as NR*$_2$, OR*, SeR*, TeR*, PR*$_2$, AsR*$_2$, SbR*$_2$, SR*, BR*$_2$ and the like or where at least one non-carbon atom or group has been inserted within the halocarbyl radical such as —O—, —S—, —Se—, —Te—, —N(R*)—, =N—, —P(R*)—, =P—, —As(R*)—, =As—, —Sb(R*)—, =Sb—, —B(R*)—, =B— and the like, where R* is independently a hydrocarbyl or halocarbyl radical provided that at least one halogen atom remains on the original halocarbyl radical. Additionally, two or more R* may join together to form a substituted or unsubstituted saturated, partially unsaturated or aromatic cyclic or polycyclic ring structure. Substituted halocarbyl radicals are only bonded via a carbon atom.

A heteroatom is an atom other than carbon or hydrogen.

The term "aryl" or "aryl group" means a monocyclic or polycyclic aromatic ring and the substituted variants thereof, including phenyl, naphthyl, 2-methyl-phenyl, xylyl, 4-bromo-xylyl. Likewise, "heteroaryl" is an aryl group where a ring carbon atom (or two or three ring carbon atoms) has been replaced with a heteroatom, such as N, O, or S. The term "substituted aryl" means: 1) an aryl group where a hydrogen has been replaced by a substituted or unsubstituted hydrocarbyl group, a substituted or unsubstituted halocarbyl group, a substituted or unsubstituted silylcarbyl group, or a substituted or unsubstituted germylcarbyl group. The term "substituted heteroaryl" means: 1) a heteroaryl group where a hydrogen has been replaced by a substituted or unsubstituted hydrocarbyl group, a substituted or unsubstituted halocarbyl group, a substituted or unsubstituted silylcarbyl group, or a substituted or unsubstituted germylcarbyl group.

For nomenclature purposes, the following numbering schemes are used for indenyl, tetrahydro-s-indacenyl and tetrahydro-as-indacenyl ligands.

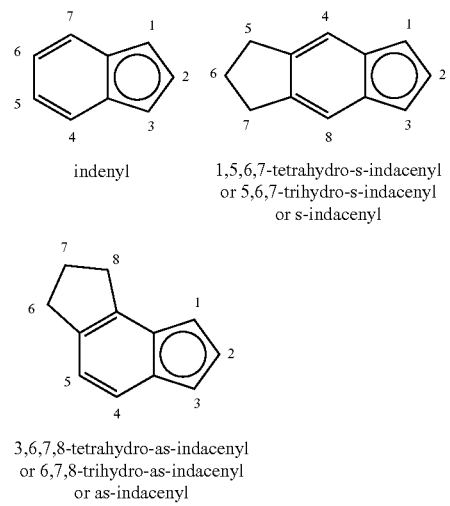

indenyl 1,5,6,7-tetrahydro-s-indacenyl
or 5,6,7-trihydro-s-indacenyl
or s-indacenyl 3,6,7,8-tetrahydro-as-indacenyl
or 6,7,8-trihydro-as-indacenyl
or as-indacenyl Unless otherwise indicated, Mn is number average molecular weight, Mw is weight average molecular weight, and Mz is z average molecular weight, wt. % is weight percent, and mol % is mol percent. Molecular weight distribution (MWD), also referred to as polydispersity, is defined to be Mw divided by Mn. Unless otherwise noted, all molecular weight units (e.g., Mw, Mn, Mz) are g/mol.

The following abbreviations may be used herein: Me is methyl, Et is ethyl, Pr is propyl, cPr is cyclopropyl, nPr is n-propyl, iPr is isopropyl, Bu is butyl, nBu is normal butyl, iBu is isobutyl, sBu is sec-butyl, tBu is tert-butyl, Oct is octyl, Ph is phenyl, Bn is benzyl, Cp is cyclopentadienyl, Ind is indenyl, Flu is fluorenyl, and MAO is methylalumoxane.

For purposes of the present disclosure, a "catalyst system" is the combination of at least one catalyst compound, at least one activator, an optional co-activator, and an optional support material. For the purposes of the present disclosure, when catalyst systems are described as comprising neutral stable forms of the components, it is well understood by one of ordinary skill in the art, that the ionic form of the component is the form that reacts with the monomers to produce polymers. For the purposes of the present disclosure, "catalyst system" includes both neutral and ionic forms of the components of a catalyst system, such as the catalyst compounds.

In the description herein, the catalyst may be described as a catalyst precursor, a pre-catalyst, a pre-catalyst compound, a metallocene catalyst compound, a metallocene catalyst, or a transition metal compound, and these terms are used interchangeably.

A metallocene catalyst is defined as an organometallic transition metal compound with at least one π-bound cyclopentadienyl moiety (or substituted cyclopentadienyl moiety) bound to a transition metal.

For purposes of the present disclosure, in relation to metallocene catalyst compounds, the term "substituted" means that one or more hydrogen atoms have been replaced with a hydrocarbyl, heteroatom (such as a halide), or a heteroatom containing group, (such as silylcarbyl, germylcarbyl, halocarbyl, etc.). For example, methyl cyclopentadiene (Cp) is a Cp group substituted with a methyl group. Two or more adjacent hydrogen atoms may be replaced by a hydrocarbdiyl to form a multi-ring cyclopentadienyl moiety for example, indenyl, fluorenyl, tetrahydro-s-indacenyl and the like.

For purposes of the present disclosure, "alkoxides" include those where the alkyl group is a $C_1$ to $C_{10}$ hydrocarbyl. The alkyl group may be straight chain, branched, or cyclic. The alkyl group may be saturated or unsaturated. In some embodiments, the alkyl group may comprise at least one aromatic group.

Embodiments

The present disclosure provides methods for producing olefin polymer comprising: i) contacting $C_{3+}$olefin (such as $C_{3-40}$ olefin) and ethylene, with a catalyst system comprising activator and a bridged monocyclopentadienyl transition metal compound, and ii) obtaining an $C_3$ to $C_{40}$ olefin-ethylene copolymer comprising from 0.5 to 43 wt % ethylene, from 99.5 to 57 wt % $C_3$ to $C_{40}$ comonomer, wherein the polymer has a crystallinity is from 0 to 3%, a MFR (at 230° C., 2.16 kg) of 0.2 to 2000 g/10 min, and a Tg of 0 to −60 as measured by Differential Scanning calorimetry (DSC).

In some embodiments of the present disclosure, the ethylene-$C_3$ to $C_{40}$-comonomer polymer has a g' of 0.90 or greater, such as 0.95 or greater, such as 0.98 or greater, such as about 1. Catalyst systems and methods of the present disclosure provide formation of ethylene-$C_3$ to $C_{40}$ comonomer copolymers (such as propylene-ethylene copolymers) at increased activity levels (e.g., 30,000 gP/mmol cat·hr or greater) and efficiency levels (e.g., 10,000 g poly/g cat or greater) while maintaining or improving other polymer properties (such as Mn), as compared to conventional catalyst systems and methods that produce propylene-ethylene copolymers.

Olefin-Ethylene Polymer

The present disclosure provides compositions of matter produced by the methods of the present disclosure.

The term "olefin-ethylene polymer" as used herein can be any polymer comprising $C_{3+}$ olefin (such as $C_3$-$C_{40}$ monomer, preferably propylene), and ethylene. Preferably, the olefin-ethylene polymer is an α-olefin-ethylene polymer. Preferably, the α-olefin-ethylene polymer is a copolymer and includes α-olefin-derived units, and ethylene-derived units. For example, the α-olefin-ethylene copolymer may be a propylene-ethylene copolymer. The propylene-ethylene copolymers may be prepared by polymerizing ethylene and propylene with optionally one or more additional α-olefins.

A $C_3$ to $C_{40}$ monomer can be a $C_3$-$C_{40}$ α-olefin. $C_3$-$C_{40}$ α-olefins include substituted or unsubstituted $C_3$ to $C_{40}$ α-olefins, such as $C_3$ to $C_{20}$ α-olefins, such as $C_3$ to $C_{12}$ α-olefins, preferably propylene, 1-butene, 1-pentene, 1-hexene, 1-heptene, 1-octene, 1-nonene, 1-decene, 1-undecene, 1-dodecene and isomers thereof. $C_3$ to $C_{40}$ α-olefins may be linear, branched, or cyclic. $C_3$ to $C_{40}$ cyclic olefins may be strained or unstrained, monocyclic or polycyclic, and may include heteroatoms and/or one or more functional groups. Non-limiting examples of cyclic olefins include norbornene, cyclopentene, 5-methylcyclopentene, cycloheptene, cyclooctene, and cyclododecene. Preferred linear α-olefins include propylene, 1-butene, 1-hexene, or 1-octene. Preferred branched $C_3$-$C_{40}$ α-olefins include 4-methyl-1-pentene, 3-methyl-1-pentene, 5-methyl-1-nonene, and 3,5,5-trimethyl-1-hexene. Preferred α-olefin comonomers are propylene and 1-butene, most preferably propylene. The $C_3$-$C_{40}$ α-olefins contain only one polymerizable double bond and are not dienes.

Typically, the α-olefin-ethylene polymer has an α-olefin content of from 99.5 wt % to 57 wt %, such as from 99 to 58 wt %, such as from 98 wt % to 59 wt %, such as 97 wt % to 60 wt %, such as 95 wt % to 62 wt %. In some embodiments of the invention, the α-olefin content is 57 wt % or greater, alternatively 60 wt % or greater, alternatively 62 wt % or greater, alternatively 65 wt % or greater, alternatively 70 wt % or greater, alternatively 75 wt % or greater, alternatively 80 wt % or greater, alternatively 85 wt % or greater. The balance of the α-olefin-ethylene polymer comprises ethylene.

Typically, the α-olefin-ethylene polymer has an ethylene content of from 0.5 wt % to 43 wt %, such as from 1 wt % to 42 wt %, such as from 2 wt % to 41 wt % such as 3 wt % to 40 wt %, such at 4 wt % to 38 wt %. In some embodiments of the invention, the ethylene content is 43 wt % or less, alternatively 42 wt % or less, alternatively 40 wt % or less, alternatively 38 wt % or less, alternatively 35 wt % or less, alternatively 30 wt % or less, alternatively 25 wt % or less, alternatively 20 wt % or less, alternatively 15 wt % or less, with a lower limit of 0.5 wt % or more, such as 1 wt % or more, such as 2 wt % or more, such as 3 wt % or more. The balance of the α-olefin-ethylene polymer comprises one or more α-olefins.

In alternate embodiments, the α-olefin-ethylene polymer is a propylene-ethylene copolymer having an ethylene content from 0.5 wt. % to 43 wt. % (such as from 1 wt. % to 38 wt. %), a propylene content from 99.5 wt. % to 57 wt. % (such as from 99 wt. % to 62 wt. %).

Typically, the α-olefin-ethylene polymer has: 1) an α-olefin content of from 99.5 wt % to 57 wt %, such as from 99 to 62 wt %, such as from 98 wt % to 70 wt %; and 2) an ethylene content of from 0.5 wt % to 43 wt %, such as from 1 wt % to 38 wt %, such as from 2 wt % to 30 wt %.

In a preferred embodiment, the α-olefin-ethylene polymer is substantially free of diene monomers.

The α-olefin-ethylene polymer may have a weight average molecular weight (Mw) of 1,000,000 g/mol or less, a number average molecular weight (Mn) of 500,000 g/mol or less, a z-average molecular weight (Mz) of 2,000,000 g/mol or less, and, optionally, a g' index of 0.90 or greater, all of which may be determined by Gel Permeation Chromatography (GPC). The α-olefin-ethylene polymer of the present disclosure may have an Mn of from 10,000 to 500,000 g/mol, such as from 10,000 to 400,000 g/mol, such as from 20,000 to 350,000 g/mol, such as from 40,000 to 300,000 g/mol, such as from 50,000 to 250,000 g/mol. The α-olefin-ethylene polymer of the present disclosure may have an Mw of from 20,000 to 1,000,000 g/mol, such as 30,000 to 800,000, such as from 50,000 to 700,000 g/mol, such as from 50,000 to 600,000 g/mol, such as from 50,000 to 500,000 g/mol. The α-olefin-ethylene polymer of the present disclosure may have an Mz of from 50,000 to 2,000,000 g/mol, such as from 100,000 to 1,500,000 g/mol, such as from 120,000 to 1,000,000 g/mol, such as from 150,000 to 800,000 g/mol. For purposes of this disclosure, the Mw, Mn and Mz will be defined as measured by a light scattering detector of GPC.

The molecular weight distribution (MWD=(Mw/Mn)), also referred to as a "polydispersity index" (PDI), of the α-olefin-ethylene polymer may be from 1.2 to 40. For example, an α-olefin-ethylene polymer may have an MWD with an upper limit of 40, or 30, or 20, or 10, or 9, or 8, or 7, or 6, or 5, or 4, or 3, and a lower limit of 1.2, or 1.3, or 1.4, or 1.5, or 1.6, or 1.7, or 1.8, or 2.0. In one or more embodiments, the MWD of the α-olefin-ethylene polymer is from 1 to 10, such as from 1.2 to 7, such as from 1.5 to 5, such as from 1.8 to 3. In one or more embodiments, the MWD of the α-olefin-ethylene polymer is greater than 1.8 and less than 4.0. In one or more embodiments, the MWD of the α-olefin-ethylene polymer is greater than 1.5 and less than 3.5. For purposes of this disclosure, the PDI will be defined as the Mw/Mn as measured by a light scattering detector of GPC.

The α-olefin-ethylene polymer of the present disclosure may have a g' index value of 0.90 or greater, such as at least 0.95, or at least 0.98, or at least 0.99, wherein g' is measured at the Mw of the polymer using the intrinsic viscosity of isotactic polypropylene as the baseline. For use herein, the branching index, g' (also referred to as g' index or g'vis), is defined as:

$$g' = \frac{\eta_b}{\eta_l}$$

where $\eta_b$ is the intrinsic viscosity of the α-olefin-ethylene polymer and $\eta_l$ is the intrinsic viscosity of a linear polymer of the same viscosity-averaged molecular weight (Mv) as the α-olefin-ethylene polymer. Thus, $\eta_l = KM_v^\alpha$, where K and α are as described below in the GPC-SEC method herein for determining molecular weights.

In another embodiment of the invention, the α-olefin-ethylene polymer may have a g' index value of from 0.80 to less than 0.95, indicating a polymer structure with a small amount of long chain branching.

The α-olefin-ethylene polymer of the present disclosure may have a density of from 0.83 g/cm³ to 0.92 g/cm³, or from 0.85 g/cm³ to 0.91 g/cm³, or from 0.85 g/cm³ to 0.90 g/cm³, at room temperature as determined by ASTM D-1505 test method.

The α-olefin-ethylene polymer of the present disclosure may have a melt flow rate (MFR, 2.16 kg weight at 230° C.), equal to or greater than 0.2 g/10 min as measured according to ASTM D-1238. Preferably, the MFR (2.16 kg at 230° C.) is from 0.2 g/10 min to 2000 g/10 min, such as from 0.2 g/10 min to 1000 g/10 min, such as from 0.2 g/10 min to 500 g/10 min, such as from 0.2 g/10 min to 400 g/10 min, such as from 0.2 g/10 min to 300 g/10 min, such as from 0.2 g/10 min to 200 g/10 min, such as from 0.5 g/10 min to 100 g/10 min, such as from 0.5 g/10 min to 50 g/10 min. In some embodiments of the invention, the MFR is less than 100 g/10 min, alternatively less than 80 g/10 min, alternatively less than 60 g/10 min, alternatively less than 40 g/10 min, alternatively less than 20 g/10 min, alternatively less than 10 g/10 min. In some embodiments of the invention, the MFR is less than 20 g/10 min, preferably less than 10 g/10 min.

The α-olefin-ethylene polymer of the present disclosure may have a Mooney viscosity ML (1+4) at 125° C., as determined according to ASTM D1646, of greater than 1, or greater than 5, or greater than 10, or greater than 20.

The α-olefin-ethylene polymer of the present disclosure may have a heat of fusion (Hf) determined by the DSC procedure described herein, which is from 0 Joules per gram (J/g) to 50 J/g or less, such as from 0 J/g to 40 J/g. Typically the heat of fusion is equal to or greater than 0 J/g, and is equal to or less than 50 J/g, or equal to or less than 40 J/g, or equal to or less than 30 J/g, or equal to or less than 20 J/g, or equal to or less than 10 J/g, or equal to or less than 5 J/g. The α-olefin-ethylene polymer of the present disclosure may have a $H_f$, as measured from the first heating cycle after annealing for example at 140° C. for 5 minutes and then aging at room temperature for 1 hour, or 1 day, or 1 week, or 4 weeks by the DSC procedure described herein of <1 J/g.

The crystallinity of an α-olefin-ethylene polymer of the present disclosure may be expressed in terms of percentage of crystallinity (i.e., % crystallinity). The α-olefin-ethylene polymer may have a % crystallinity of less than 15%, or less than 10%, or less than 5%, or less than 3%. In some embodiments, an α-olefin-ethylene polymer may have a % crystallinity of from 0% to 3%, such as from 0% to 2%, such as from 0% to 1%, such as 0% to 0.5%. In one of more embodiments, the α-olefin-ethylene polymer may have crystallinity of less that 2%, alternatively less than 1%, alternatively less than 0.5%, alternatively less than 0.25%. In an embodiment of the invention, the α-olefin-ethylene polymer has no measureable crystallinity (0% crystallinity). Alternately, in an embodiment of the invention, the α-olefin-ethylene polymer has no measureable heat of fusion. The degree of crystallinity is determined by dividing heat of fusion of the α-olefin-ethylene polymer (as determined according to the DSC procedure described herein) by the heat of fusion for 100% crystalline polypropylene which has the value of 207 J/g (B. Wunderlich, Thermal Analysis, Academic Press, 1990, pp. 417-431.)

The α-olefin-ethylene polymer of the present disclosure may have a single broad melting transition. Alternately, the α-olefin-ethylene polymer of the present disclosure may show secondary melting peaks adjacent to the principal peak, but for purposes herein, such secondary melting peaks are considered together as a single melting point, with the highest of these peaks (relative to baseline as described herein) being considered as the melting point of the α-olefin-ethylene polymer.

The α-olefin-ethylene polymer of the present disclosure may have a melting point, as measured by the DSC procedure described herein, of less than 100° C., or less than 90° C., or less than 80° C., or less than or equal to 75° C. In one or more embodiments, the α-olefin-ethylene polymer has no measureable melting point.

In an alternate embodiment, the α-olefin-ethylene polymer of the present disclosure may have a glass transition temperature (Tg), as determined by the DSC procedure described herein, from 0° C. to −60° C., such as from −2° C. to −55° C., such as from −5° C. to −50° C., such as from −7 to 48° C. In some embodiments of the invention, the Tg is less than 0° C., such as less than −2° C., such as less than −5° C. with a lower limit of greater than −60° C., such as greater than −55° C., such as greater than −50° C.

In an alternate embodiment, the α-olefin-ethylene polymer (such as $C_3$-$C_{40}$-olefin-ethylene copolymer) comprising from 0.5 to 43 wt % ethylene, from 99.5 to 57 wt % $C_{3+}$ olefin (such as $C_3$ to $C_{40}$ olefin), has a $T_g$ (° C.) greater than or equal to −8.4295-1.2019*E and less than or equal to 0.5705-1.2019*E, wherein E is the weight fraction of ethylene in the polymer measured by FTIR. Alternatively, the α-olefin-ethylene polymer has a $T_g$ (° C.) greater than or equal to −7.9295-1.2019*E and less than or equal to 0.0705-1.2019*E, wherein E is the weight fraction of ethylene in the polymer measured by FTIR; alternatively, a $T_g$ (° C.) greater than or equal to −7.4295-1.2019*E and less than or equal to −0.4295-1.2019*E, wherein E is the weight fraction of ethylene in the polymer measured by FTIR; alternatively a $T_g$ (° C.) greater than or equal to −6.9295-1.2019*E and less than or equal to −0.9295-1.2019*E wherein E is the weight fraction of ethylene in the polymer measured by FTIR.

In a preferred embodiment the polymer produced herein has a unimodal or multimodal molecular weight distribution as determined by Gel Permeation Chromatography (GPC). By "unimodal" is meant that the GPC trace has one peak or inflection point. By "multimodal" is meant that the GPC trace has at least two peaks or inflection points. An inflection point is that point where the second derivative of the curve changes in sign (e.g., from negative to positive or vice versus).

Unless otherwise indicated Mw, Mn and Mw/Mn are determined by using High Temperature Gel Permeation Chromatography as described in the Experimental section below.

In some embodiments of the invention, the ethylene content by wt % is related to the mole fraction of [PPP] triad sequences of the polymer as determined by $^{13}$C NMR.

In an embodiment, the [PPP] mole fraction is greater than $1-0.0296*x+0.0000658*x^2+0.00000349*x^3-0.10$ and less than $1-0.0296*x+0.0000658*x^2+0.00000349*x^3+0.10$ where x is the wt % of ethylene as measured by $^{13}$C NMR and the wt % of ethylene is between 0.5 wt % and 43 wt %, alternatively between 1 wt % and 43 wt %.

In an alternate embodiment, the [PPP] mole fraction is greater than $1-0.0296*x+0.0000658*x^2+0.00000349*x^3-0.08$ and less than $1-0.0296*x+0.0000658*x^2+0.00000349*x^3+0.08$ where x is the wt % of ethylene as measured by $^{13}$C NMR and the wt % of ethylene is between 0.5 wt % and 43 wt %, alternatively between 1 wt % and 43 wt %.

In a preferred embodiment, the [PPP] mole fraction is greater than $1-0.0296*x+0.0000658*x^2+0.00000349*x^3-0.06$ and less than $1-0.0296*x+0.0000658*x^2+0.00000349*x^3+0.06$ where x is the wt % of ethylene as measured by $^{13}$C NMR and the wt % of ethylene is between 0.5 wt % and 43 wt %, alternatively between 1 wt % and 43 wt %.

Alternatively, in a preferred embodiment, the [PPP] mole fraction is greater than $1-0.0296*x+0.0000658*x^2+0.00000349*x^3-0.05$ and less than $1-0.0296*x+0.0000658*x^2+0.00000349*x^3+0.05$ where x is the wt % of ethylene as measured by $^{13}$C NMR and the wt % of ethylene is between 0.5 wt % and 43 wt %, alternatively between 1 wt % and 43 wt %. In all equations relating wt % ethylene and [PPP] mole fraction as measured by $^{13}$C NMR, [PPP] is always less than 1, and greater than zero.

In some embodiments of the invention, the ethylene content by wt % is related to the mole fraction of [EEP] triad sequences of the polymer as determined by $^{13}$C NMR.

In a preferred embodiment, the [EEP] mole fraction is greater than $0.0067*x-0.050$ where x is the wt % of ethylene as measured by $^{13}$C NMR and the wt % of ethylene is between 7 wt % and 43 wt %.

Alternatively, in a preferred embodiment, the [EEP] mole fraction is greater than $0.0067*x-0.043$ where x is the wt % of ethylene as measured by $^{13}$C NMR and the wt % of ethylene is between 6 wt % and 43 wt %.

In some embodiments of the invention, the propylene sequences in the propylene rich ethylene-propylene copolymer are not isotactic.

In some embodiments of the invention, the propylene sequences in the propylene rich ethylene-propylene copolymer are syndiotactic-rich. When the propylene content is above 90 wt %, the % IT dyads as measured by $^{13}$C NMR are greater than 25%, alternatively greater than 30%, alternatively greater than 35%, alternatively greater than 40%.

In some embodiments of the invention, the average $CH_2$ sequence length for 6$^+$ carbons as measured by $^{13}$C NMR is less than 10, alternatively less than 9.5, alternatively 9 or lower, with a lower limit of 4 or greater, alternatively 5 or greater, alternatively 6 or greater.

The α-olefin-ethylene polymer of the present disclosure may be a blend of discrete α-olefin-ethylene polymers as long as the polymer blend has the properties of the α-olefin-ethylene copolymer as described herein. The number of α-olefin-ethylene polymers may be three or less, or two or less. In one or more embodiments, the α-olefin-ethylene polymer includes a blend of two α-olefin-ethylene copolymers differing in the ethylene content, and/or the alpha-olefin content. In one or more embodiments, the α-olefin-ethylene polymer includes a blend of two propylene-ethylene copolymers differing in the ethylene content, and/or the propylene content. In one or more embodiments, an α-olefin-ethylene polymer includes a blend of two butene-ethylene copolymers differing in the ethylene content, and/or the butene content. Preparation of such polymer blends may be as described in US 2004/0024146 and US 2006/0183861.

Compositions comprising the α-olefin-ethylene polymer may contain the α-olefin-ethylene polymer in an amount of from 1 wt. % to 99 wt. %, such as from 1 wt. % to 30 wt. %, based on the weight of the composition. Preferably, the composition includes the α-olefin-ethylene polymer in an amount of from 5 wt. % to 95 wt. %, such as from 10 wt. % to 90 wt. %, such as from 15 wt. % to 80 wt. %, such as from 20 wt. % to 75 wt. %, such as from 25 wt. % to 70 wt. %, such as from 30 wt. % to 65 wt. %, such as from 35 wt. % to 60 wt. %, such as from 40 wt. % to 50 wt. %, based on the weight of the composition. Compositions may be tire tread compositions, belt compositions, and/or adhesive blend compositions. Such polymers may be used in various other applications such as compounding, polymer modification, adhesives, films and sheets. More specific applications include but not limited to thermoplastic engineering grips, raffia packaging, rigid packaging, hygiene, waterproofing membrane, stretch hood film, recycle film, and hot melt and pressure sensitive adhesives. The Propylene-ethylene copolymers can be used as an additive (e.g., to polyolefins such as polyethelene and polypropylene) or a major polymeric component (e.g., in adhesives or serving as a polymeric binder for bitumen, asphalt, etc.). They can impart desired properties such as transparency, elasticity, adhesion, toughness, filler loading, cling/tackiness, softness, flexibility, and sealability, which enables advantages such as, end product performance, processing efficiencies, lower total costs, and potential sustainability benefits.

Blends

In another embodiment, the α-olefin-ethylene polymer produced herein is combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, polyisobutylene and/or thermoplastic vulcanizate compositions.

In at least one embodiment, the α-olefin-ethylene polymer is present in the above blends, at from 1 to 99 wt. %, based upon the weight of the polymers in the blend, preferably 10 to 95 wt. %, even more preferably at least 20 to 90 wt. % even more preferably at least 30 to 90 wt. %, even more preferably at least 40 to 90 wt. %, even more preferably at least 50 to 90 wt. %, even more preferably at least 60 to 90 wt. %, even more preferably at least 70 to 90 wt. %.

Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; and the like.

Films

The α-olefin-ethylene polymer of the present disclosure, or blends/compositions thereof, may be used in a variety of end-use applications. Such applications include, for example, mono- or multi-layer blown, extruded, and/or shrink films. These films may be formed by any number of well-known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxially orientation can be accomplished using typical cold drawing or hot drawing methods. Biaxial orientation can be accomplished using tenter frame equipment or a double bubble processes and may occur before or after the individual layers are brought together. For example, a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. Typically the films are oriented in the Machine Direction (MD) at a ratio of up to 15, preferably between 5 and 7, and in the Transverse Direction (TD) at a ratio of up to 15, preferably 7 to 9. However, in another embodiment the film is oriented to the same extent in both the MD and TD directions.

The films may vary in thickness depending on the intended application; however, films of a thickness from 1 to 50 μm are usually suitable. Films intended for packaging are usually from 10 to 50 μm thick. The thickness of the sealing layer is typically 0.2 to 50 μm. There may be a sealing layer on both the inner and outer surfaces of the film or the sealing layer may be present on only the inner or the outer surface.

In another embodiment, one or more layers may be modified by corona treatment, electron beam irradiation, gamma irradiation, flame treatment, or microwave. In at least one embodiment, one or both of the surface layers is modified by corona treatment.

Uses

The α-olefin-ethylene polymers of the present disclosure may be used as an additive (e.g., to polyolefins such as polyethelene and polypropylene) or a major polymeric component (e.g., in adhesives or serving as a polymeric binder for bitumen, asphalt, etc.) in a variety of applications, such as compounding, polymer modification, adhesives, and film and sheet. More specific applications include but not limited to thermoplastic engineering grips, raffia packaging, rigid packaging, hygiene, waterproofing membrane, stretch hood film, recycle film, and hot melt and pressure sensitive adhesives. They can impart desired properties such as transparency, elasticity, adhesion, toughness, filler loading, cling/tackiness, softness, flexibility, and sealability, which enables advantages such as, end product performance, processing efficiencies, lower total costs, and potential sustainability benefits.

Polymerization Processes

The present disclosure provides polymerization processes including contacting ethylene and $C_3$-$C_{40}$ comonomer, such as a $C_3$-$C_{40}$ α-olefin (such as propylene) with a catalyst system comprising an activator, optional support, and a catalyst compound. The catalyst compound, optional support and activator may be combined in any order, and are combined typically prior to contacting the catalyst system with the monomers (ethylene and $C_3$-$C_{40}$ comonomer).

Useful $C_3$ to $C_{40}$ comonomers include $C_3$-$C_{40}$ α-olefins. $C_3$-$C_{40}$ α-olefins include substituted or unsubstituted $C_3$ to $C_{40}$ α-olefins, such as $C_3$ to $C_{20}$ α-olefins, such as $C_3$ to $C_{12}$ α-olefins, preferably propylene, 1-butene, 1-pentene, 1-hexene, 1-heptene, 1-octene, 1-nonene, 1-decene, 1-undecene, 1-dodecene and isomers thereof. $C_3$ to $C_{40}$ α-olefins may be linear, branched, or cyclic. $C_3$ to $C_{40}$ cyclic olefins may be strained or unstrained, monocyclic or polycyclic, and may include heteroatoms and/or one or more functional groups. Non-limiting examples of cyclic olefins include norbornene, cyclopentene, 5-methylcyclopentene, cycloheptene, cyclooctene, and cyclododecene. Preferred linear α-olefins include propylene, 1-butene, 1-hexene, or 1-octene. Preferred branched $C_3$-$C_{40}$ α-olefins include 4-methyl-1-pentene, 3-methyl-1-pentene, 5-methyl-1-nonene, and 3,5,5-trimethyl-1-hexene. Preferred α-olefin comonomers are propylene and 1-butene, most preferably propylene. $C_3$-$C_{40}$ α-olefin comonomers exclude diene monomers.

Polymerization processes of the present disclosure can be carried out in any suitable manner, such as any suitable suspension, homogeneous, bulk, solution, slurry, or gas phase polymerization process. Such processes can be run in a batch, semi-batch, or continuous mode. Gas phase polymerization processes and slurry processes are preferred.

A homogeneous polymerization process is a process where at least 90 wt. % of the product is soluble in the reaction media. A bulk polymerization is a polymerization process in which the monomers and/or comonomers being polymerized are used as a solvent or diluent using little or no inert solvent as a solvent or diluent. A small fraction of inert solvent might be used as a carrier for catalyst and scavenger. A bulk polymerization system preferably contains less than 25 wt. % of inert solvent or diluent, preferably less than 10 wt. %, preferably less than 1 wt. %, preferably 0 wt. %. Alternatively, no solvent or diluent is present or added in the reaction medium, (except for the small amounts used as the carrier for the catalyst system or other additives, or amounts typically found with the monomer; e.g., propane in propylene).

In another embodiment, the process is a slurry process. As used herein the term "slurry polymerization process" includes a polymerization process where a supported catalyst is used and monomers are polymerized on or around the supported catalyst particles. Typically, at least 95 wt. % of polymer products obtained from the supported catalyst after polymerization are in granular form as solid particles (not dissolved in the diluent).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™, which is isoparaffins); perhalogenated hydrocarbons, such as perfluorinated $C_{4-10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In at least one embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt. %, preferably less than 0.5 wt. %, preferably 0 wt. % based upon the weight of the solvents.

In at least one embodiment, the feed concentration of the monomers and comonomers for the polymerization is from 1 vol % in solvent to 60 vol % in solvent, such as 1 vol % in solvent to 40 vol % in solvent, such as 1 vol % in solvent to 20 vol % in solvent, based on the total volume of the feedstream. Preferably the polymerization is a continuous process. In a preferred embodiment, the feed concentration of monomers and comonomers for the polymerization is from 1 wt % to 10 wt % ethylene in solvent, from 1 wt % to 20 wt % propylene in solvent, and from 0 wt % to 0.5 wt % hydrogen in solvent, based on the total mass flow rate of the feedstream, preferably the solvent is hexane or isohexane.

Preferred polymerizations can be run at any temperature and/or pressure suitable to obtain the desired polymers. Typical temperatures and/or pressures include a temperature in the range of from 0° C. to 300° C., such as 20° C. to 200° C., such as 40° C. to 180° C., such as from 50° C. to 160° C., such as from 60° C. to 140° C.; and at a pressure from 0.35 MPa to 16 MPa, such as from 0.45 MPa to 13 MPa, such as from 0.5 MPa to 12 MPa, such as from 2 MPa to 10 MPa, for example 2.2 MPa. In some embodiments of the invention, the pressure is from 0.35 MPa to 17.23 MPa.

In a typical polymerization, the run time of the reaction is up to 300 minutes, preferably in the range of from about 5 to 250 minutes, or preferably from about 10 to 120 minutes.

In some embodiments hydrogen is present in the polymerization reactor at a partial pressure of 0.001 to 50 psig (0.007 to 345 kPa), preferably from 0.01 to 25 psig (0.07 to 172 kPa), more preferably 0.1 to 10 psig (0.7 to 70 kPa).

In at least one embodiment, the catalyst efficiency is from 5,000 g polymer/g catalyst (g poly/g cat) to 2,000,000 g poly/g cat, such as from 10,000 g poly/g cat to 1,500,000 g poly/g cat, such as from 20,000 g poly/g cat to 1,250,000 g poly/g cat, such as from 30,000 g poly/g cat to 1,000,000 g poly/g cat. In another embodiment, the catalyst efficiency is greater than 10,000 g poly/g cat, alternatively greater than 20,000 g poly/g cat, alternatively greater than 30,000 g poly/g cat, alternatively greater than 40,000 g poly/g cat, alternatively greater than 50,000 g poly/g cat, alternatively greater than 100,000 g poly/g cat, alternatively greater than 200,000 g poly/g cat, alternatively greater than 300,000 g poly/g cat, alternatively greater than 400,000 g poly/g cat, alternatively greater than 500,000 g poly/g cat.

For calculating catalyst efficiency, also referred to as catalyst productivity, only the weight of the transition metal component of the catalyst is used.

In at least one embodiment, little or no scavenger is used in the process to produce the polymer. In some embodiments, scavenger (such as trialkyl aluminum) is present at zero mol %, alternately the scavenger is present at a molar ratio of scavenger metal to transition metal of less than 100:1, preferably less than 50:1, preferably less than 30:1.

In some embodiments of the invention, the polymerization: 1) is conducted at temperatures of 0° C. to 300° C. (such as 25° C. to 200° C., such as 40° C. to 180° C., such as 50° C. to 160° C., such as 60° C. to 140° C., such as 60° C. to 130° C., such as 60° C. to 120° C.).; 2) is conducted at a pressure of atmospheric pressure from to 25 MPa (such as 1 to 20 MPa, such as from 1 to 15 MPa, such as 2 to 14 MPa, such as 2 to 13 MPa, such as 2 to 12 MPa, such as 2 to 11 MPa, such as 2 to 10 MPa); 3) is conducted in an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; preferably where aromatics are preferably present in the solvent at less than 1 wt. %, preferably less than 0.5 wt. %, preferably at 0 wt. % based upon the weight of the solvents); 4) the polymerization can occur in one reaction zone; and 5) optionally hydrogen is present in the polymerization reactor at a wt.-ppm hydrogen to ethylene of 0 to 1000 wt. ppm, alternatively 0 to 800 wt. ppm, alternatively 0 to 600 ppm, alternatively 0 to 500 ppm, alternatively 0 to 400 ppm, alternatively 0 to 300 ppm, alternatively 0 to 200 ppm, alternatively 0 to 150 ppm, alternatively 0 to 100 ppm. In some embodiments hydrogen is present in the polymerization reactor at a wt.-pp hydrogen to ethylene of less than 1000 wt. ppm, alternatively, less than 750 ppm, alternatively less than 500 ppm, alternatively less than 400 ppm, alternatively less than 300 ppm, alternatively less than 300 ppm, alternatively less than 200 ppm, alternatively less than 150 ppm, alternatively less than 100 ppm, alternatively less than 50 ppm.

A "reaction zone" also referred to as a "polymerization zone" is a vessel where polymerization takes place, for example a batch or continuous reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In at least one embodiment, the polymerization occurs in one reaction zone. In an alternative embodiment, the polymerization occurs in two reaction zones, either in series or parallel.

Gas Phase Polymerization

Generally, in a fluidized gas bed process used for producing polymers, a gaseous stream containing one or more monomers (preferably $C_3$-$C_{40}$ olefin, ethylene) is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos.

4,543,399, 4,588,790, 5,028,670, 5,317,036, 5,352,749, 5,405,922, 5,436,304, 5,453,471, 5,462,999, 5,616,661 and 5,668,228 all of which are fully incorporated herein by reference.)

Slurry Phase Polymerization

A slurry polymerization process generally operates between 1 to about 50 atmosphere pressure range (15 psi to 735 psi, 103 kPa to 5068 kPa) or even greater and temperatures in the range of 0° C. to about 120° C. In a slurry polymerization, a suspension of solid, particulate polymer is formed in a liquid polymerization diluent medium to which monomers (ethylene, a $C_3$-$C_{40}$ comonomer) along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used, the process must be operated above the reaction diluent critical temperature and pressure. Preferably, a hexane or an isobutane medium is employed.

In at least one embodiment, polymerization process is a particle form polymerization, or a slurry process, where the temperature is kept below the temperature at which the polymer goes into solution. Such technique is well known in the art, and described in for instance U.S. Pat. No. 3,248,179 which is fully incorporated herein by reference. The preferred temperature in the particle form process is within the range of about 85° C. to about 110° C. Two preferred polymerization methods for the slurry process are those using a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In another embodiment, the slurry process is carried out continuously in a loop reactor. The catalyst, as a slurry in isohexane or other diluent or as a dry free flowing powder, is injected regularly to the reactor loop, which is itself filled with circulating slurry of growing polymer particles in a diluent of isohexane or other diluent containing monomer and comonomer. Hydrogen, optionally, may be added as a molecular weight control. (In one embodiment hydrogen is added from 50 ppm to 500 ppm, such as from 100 ppm to 400 ppm, such as 150 ppm to 300 ppm.)

The reactor may be maintained at a pressure of up to 5000 kPa, such as 2,000 kPa to 5,000 kPa, such as from 3620 kPa to 4309 kPa, and at a temperature in the range of about 60° C. to about 120° C. depending on the desired polymer melting characteristics. Reaction heat is removed through the loop wall since much of the reactor is in the form of a double-jacketed pipe. The slurry is allowed to exit the reactor at regular intervals or continuously to a heated low pressure flash vessel, rotary dryer and a nitrogen purge column in sequence for removal of diluent (such as isohexane) and all unreacted monomer and comonomers. The resulting hydrocarbon free powder is then compounded for use in various applications.

Other additives may also be used in the polymerization, as desired, such as one or more scavengers, promoters, modifiers, chain transfer agents (such as diethyl zinc), reducing agents, oxidizing agents, hydrogen, aluminum alkyls, or silanes.

Useful chain transfer agents are typically alkylalumoxanes, a compound represented by the formula $AlR_3$, $ZnR_2$ (where each R is, independently, a $C_1$-$C_8$ hydrocarbyl, preferably methyl, ethyl, propyl, butyl, pentyl, hexyl octyl or an isomer thereof). Examples can include diethyl zinc, methylalumoxane, trimethylaluminum, triisobutylaluminum, trioctylaluminum, or a combination thereof.

Solution Polymerization

In a preferred embodiment, the polymerization occurs in a solution polymerization process. A solution polymerization is a polymerization process in which the polymer is dissolved in a liquid polymerization medium, such as an inert solvent or monomer(s) or their blends. A solution polymerization is typically homogeneous. A homogeneous polymerization is one where the polymer product is dissolved in the polymerization medium. Such systems are preferably not turbid as described in J. Vladimir Oliveira, C. Dariva and J. C. Pinto, Ind. Eng, Chem. Res. 29, 2000, 4627. Generally solution polymerization involves polymerization in a continuous reactor in which the polymer formed and the starting monomer and catalyst materials supplied, are agitated to reduce or avoid concentration gradients and in which the monomer acts as a diluent or solvent or in which a hydrocarbon is used as a diluent or solvent. Suitable processes typically operate at temperatures from about 0° C. to about 250° C., preferably from about 10° C. to about 200° C., more preferably from about 40° C. to about 180° C., more preferably from about 50° C. to about 160° C., more preferably from about 60° C. to about 140° C. and at pressures of about 0.1 MPa or more, preferably 25 MPa or more. The upper pressure limit is not critically constrained but typically can be about 100 MPa or less, preferably, 50 MPa or less, preferably 25 MPa or less, preferably 20 MPa or less, preferably 15 MPa or less, preferably 12 MPa or less. Temperature control in the reactor can generally be obtained by balancing the heat of polymerization and with reactor cooling by reactor jackets or cooling coils to cool the contents of the reactor, auto refrigeration, pre-chilled feeds, vaporization of liquid medium (diluent, monomers or solvent) or combinations of all three. Adiabatic reactors with pre-chilled feeds can also be used. The purity, type, and amount of solvent can be optimized for the maximum catalyst productivity for a particular type of polymerization. The solvent can be also introduced as a catalyst carrier. The solvent can be introduced as a gas phase or as a liquid phase depending on the pressure and temperature. Advantageously, the solvent can be kept in the liquid phase and introduced as a liquid. Solvent can be introduced in the feed to the polymerization reactors.

In embodiments of the invention, the monomer feed is substantially free of diene monomers.

Catalyst Compounds

The present disclosure provides polymerization processes where ethylene and a $C_{3+}$ olefin (such as $C_3$-$C_{40}$ α-olefin, preferably propylene), are contacted with a catalyst system comprising an activator, optional support, and a catalyst compound. The catalyst compound, optional support and activator may be combined in any order, and are combined typically prior to contacting the catalyst system with the monomer. In at least one embodiment, the catalyst compound is represented by formula (I):

$$T_y Cp'_m MG_n X_q \qquad (I)$$

wherein:

Cp' is a tetrahydroindacenyl group (such as tetrahydro-s-indacenyl or tetrahydro-as-indacenyl) which is optionally substituted or unsubstituted, provided that when Cp' is tetrahydro-s-indacenyl: 1) the 3 and/or 4 positions are not aryl or substituted aryl, 2) the 3 position is not directly bonded to a group 15 or 16 heteroatom, 3) there are no additional rings fused to the tetrahydroindacenyl ligand, 4) T is not bonded to the 2-position, and 5) the 5, 6, or 7-position (preferably the 6 position) is geminally disubstituted, preferably with two $C_1$-$C_{10}$ alkyl groups; M is a group 2, 3, 4, 5, or 6 transition metal, preferably group 4 transition metal, for example titanium, zirconium, or hafnium (preferably titanium);

T is a bridging group (such as dialkylsilylene, dialkylcarbylene, phen-1,2-diyl, substituted phen-1,2-diyl, cyclohex-1,2-diyl or substituted cyclohex-1,2-diyl). T is preferably $(CR^8R^9)_x$, $SiR^8R^9$ or $GeR^8R^9$ where x is 1 or 2, $R^8$ and $R^9$ are independently selected from hydrogen, substituted or unsubstituted hydrocarbyl, halocarbyl, silylcarbyl and germylcarbyl and $R^8$ and $R^9$ may optionally be bonded together to form a ring structure, and in a particular embodiment, $R^8$ and $R^9$ are not aryl);

y is 0 or 1, indicating the absence or presence of T;

G is a heteroatom group represented by the formula $JR^i_{z-y}$ where J is N, P, O or S, $R^i$ is a $C_1$ to $C_{100}$ hydrocarbyl group (such as a $C_1$ to $C_{20}$ hydrocarbyl group), and z is 2 when J is N or P, and z is 1 when J is O or S (preferably J is N and z is 2) ($R^i$ can be a linear, branched or cyclic $C_1$ to $C_{20}$ hydrocarbyl group, preferably independently selected from methyl, ethyl, propyl, butyl, pentyl, hexyl, heptyl, octyl, nonyl, decyl, phenyl, and isomers thereof, including t-butyl, cyclododecyl, cyclooctyl, adamantyl, preferably t-butyl and or cyclododecyl);

X is a leaving group (such as a halide, a hydride, an alkyl group, an alkenyl group or an arylalkyl group) and optionally two or more X may form a part of a fused ring or a ring system; m=1; n=1, 2 or 3; q=1, 2 or 3; and the sum of m+n+q is equal to the oxidation state of the transition metal (preferably 3, 4, 5, or 6, preferably 4); preferably m=1, n=1, q is 2, and y=1.

In at least one embodiment of formula (I), M is a group 4 transition metal (preferably Hf, Ti and/or Zr, preferably Ti). In at least one embodiment of formula (I), $JR^i_{z-y}$ is cyclododecyl amido, t-butyl amido, and or 1-adamantyl amido.

In at least one embodiment of formula (I), each X is, independently, selected from hydrocarbyl radicals having from 1 to 20 carbon atoms, aryls, hydrides, amides, alkoxides, sulfides, phosphides, halides, dienes, amines, phosphines, ethers, and a combination thereof, (two X's may form a part of a fused ring or a ring system), preferably each X is independently selected from halides, aryls and $C_1$ to $C_5$ alkyl groups, preferably each X is a benzyl, methyl, ethyl, propyl, butyl, pentyl, or chloro group.

In at least one embodiment of formula (I), the Cp' group may be substituted with a combination of substituent groups R. R includes one or more of hydrogen, or linear, branched alkyl radicals, or alkenyl radicals, alkynyl radicals, cycloalkyl radicals or aryl radicals, acyl radicals, alkoxy radicals, aryloxy radicals, alkylthio radicals, dialkylamino radicals, alkoxycarbonyl radicals, aryloxycarbonyl radicals, carbamoyl radicals, alkyl- or dialkyl-carbamoyl radicals, acyloxy radicals, acylamino radicals, arylamino radicals, straight, branched or cyclic, alkylene radicals, or combination thereof. In at least one embodiment, substituent groups R have up to 50 non-hydrogen atoms, preferably from 1 to 30 carbon, that can also be substituted with halogens or heteroatoms or the like, provided that when Cp' is tetrahydro-s-indacenyl: 1) the 3 and/or 4 position is not aryl or substituted aryl, 2) the 3-position is not substituted with a group 15 or 16 heteroatom, 3) there are no additional rings fused to the tetrahydroindacenyl ligand, T is not bonded to the 2-position, and 5) the 5, 6, or 7-position (preferably the 6 position) is geminally disubstituted, preferably with two $C_1$-$C_{10}$ alkyl groups. Non-limiting examples of alkyl substituents R include methyl, ethyl, propyl, butyl, pentyl, hexyl, cyclopentyl, cyclohexyl, benzyl or phenyl groups and the like, including all their isomers, for example, tertiary butyl, isopropyl and the like. Other hydrocarbyl radicals include fluoromethyl, fluoroethyl, difluoroethyl, iodopropyl, bromohexyl chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)silyl, methylbis(difluoromethyl)silyl, bromomethyldimethylgermyl and the like; and disubstituted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorus, oxygen, tin, sulfur, germanium and the like, including olefins such as, but not limited to, olefinically unsaturated substituents including vinyl-terminated ligands, for example but-3-enyl, prop-2-enyl, hex-5-enyl and the like.

In at least one embodiment of formula (I), the substituent(s) R are, independently, hydrocarbyl groups, heteroatoms, or heteroatom containing groups, such as methyl, ethyl, propyl, butyl, pentyl, hexyl, heptyl, octyl, nonyl, decyl, undecyl, dodecyl or an isomer thereof, or a $C_1$ to $C_{20}$ hydrocarbyl substituted with an N, O, S and or P heteroatom or heteroatom containing group (typically having up to 12 atoms, including the N, O, S and P heteroatoms), provided that when Cp' is tetrahydro-s-indacenyl, the 3 and/or 4 position are not aryl or substituted aryl, the 3 position is not substituted with a group 15 or 16 heteroatom, and there are no additional rings fused to the tetrahydroindacenyl ligand, T is not bonded to the 2-position, and the 5, 6, or 7-position (preferably the 6 position) is geminally disubstituted, preferably with two $C_1$-$C_{10}$ alkyl groups.

In at least one embodiment of formula (I), the Cp' group is tetrahydro-as-indacenyl or tetrahydro-s-indacenyl which may be substituted.

y can be 1 where T is a bridging group containing at least one group 13, 14, 15, or 16 element, in particular boron or a group 14, 15 or 16 element. Examples of suitable bridging groups include $P(=S)R^*$, $P(=Se)R^*$, $P(=O)R^*$, $R^*_2C$, $R^*_2Si$, $R^*_2Ge$, $R^*_2CCR^*_2$, $R^*_2CCR^*_2CR^*_2$, $R^*_2CCR^*_2CR^*_2CR^*_2$, $R^*C=CR^*$, $R^*C=CR^*CR^*_2$, $R^*_2CCR^*=CR^*CR^*_2$, $R^*C=CR^*CR^*=CR^*$, $R^*C=CR^*CR^*_2CR^*_2$, $R^*_2CSiR^*_2$, $R^*_2SiSiR^*_2$, $R^*_2SiOSiR^*_2$, $R^*_2CSiR^*_2CR^*_2$, $R^*_2SiCR^*_2SiR^*_2$, $R^*C=CR^*SiR^*_2$, $R^*_2CGeR^*_2$, $R^*_2GeGeR^*_2$, $R^*_2CGeR^*_2CR^*_2$, $R^*_2GeCR^*_2GeR^*_2$, $R^*_2SiGeR^*_2$, $R^*C=CR^*GeR^*_2$, $R^*B$, $R^*_2C—BR^*$, $R^*_2C—BR^*—CR^*_2$, $R^*_2C—O—CR^*_2$, $R^*_2CR^*_2C—O—CR^*_2CR^*_2$, $R^*_2C—O—CR^*_2CR^*_2$, $R^*_2C—O—CR^*=CR^*$, $R^*_2C—S—CR^*_2$, $R^*_2CR^*_2C—S—CR^*_2CR^*_2$, $R^*_2C—S—CR^*_2CR^*_2$, $R^*_2C—S—CR^*=CR^*$, $R^*_2C—Se—CR^*_2$, $R^*_2CR^*_2C—Se—CR^*_2CR^*_2$, $R^*_2C—Se—CR^*_2CR^*_2$, $R^*_2C—Se—CR^*=CR^*$, $R^*_2C—N=CR^*$, $R^*_2C—NR^*—CR^*_2$, $R^*_2C—NR^*—CR^*_2CR^*_2$, $R^*_2C—NR^*—CR^*=CR^*$, $R^*_2CR^*_2C—NR^*—CR^*_2CR^*_2$, $R^*_2C—

P=CR*, R*₂C—PR*—CR*₂, O, S, Se, Te, NR*, PR*, AsR*, SbR*, O—O, S—S, R*N—NR*, R*P—PR*, O—S, O—NR*, O—PR*, S—NR*, S—PR*, and R*N—PR* where R* is hydrogen or a $C_1$-$C_{20}$ containing hydrocarbyl, substituted hydrocarbyl, halocarbyl, substituted halocarbyl, silylcarbyl or germylcarbyl substituent, and optionally two or more adjacent R* may join to form a substituted or unsubstituted, saturated, partially unsaturated or aromatic, cyclic or polycyclic substituent, and optionally any one or more adjacent R* and R' may join to form a substituted or unsubstituted, saturated, partially unsaturated or aromatic, cyclic or polycyclic substituent. Preferred examples for the bridging group T include —CH₂—, —CH₂CH₂—, —SiMe₂-, —SiPh₂-, —Si(Me)(Ph)-, —Si(CH₂)₃—, —Si(CH₂)₄—, —O—, —S—, —N(Ph)-, —P(Ph)-, —N(Me)-, —P(Me)-, —N(Et)-, —N(Pr)—, —N(Bu)-, —P(Et)-, —P(Pr)—, -(Me)₂SiOSi(Me)₂-, and —P(Bu)-. In a preferred embodiment of the present disclosure, when Cp' is tetrahydro-s-indacenyl and T is R*₂Si, then R* is not aryl. In some embodiments, R* is not aryl or substituted aryl.

In at least one embodiment, the catalyst compound is one or more bridged transition metal compounds represented by formula (II):

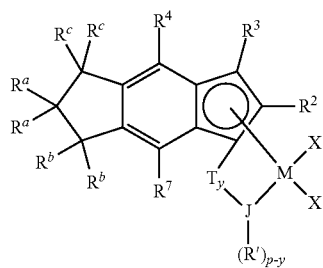

(II)

where M is a group 4 metal (such as Hf, Ti or Zr, preferably Ti);
J is N, O, S or P;
p is 2 when J is N or P, and is 1 when J is O or S (preferably J is N, y=1, and p=2);
each $R^a$ is independently $C_1$-$C_{10}$ alkyl (alternately a $C_2$-$C_{10}$ alkyl);
each $R^b$ and each $R^c$ is independently hydrogen or a $C_1$-$C_{10}$ alkyl (alternately a $C_2$-$C_{10}$ alkyl);
each $R^2$, $R^3$, $R^4$, and $R^7$ is independently hydrogen, or a $C_1$-$C_{50}$ substituted or unsubstituted hydrocarbyl, halocarbyl, silylcarbyl or germylcarbyl, provided that: 1) $R^3$ and/or $R^4$ are not aryl or substituted aryl, 2) $R^3$ is not directly bonded to a group 15 or 16 heteroatom, and 3) adjacent $R^4$, $R^c$, $R^a$, $R^b$, or $R^7$ do not join together to form a fused ring system;
each R' is, independently, a $C_1$-$C_{100}$ substituted or unsubstituted hydrocarbyl, halocarbyl, silylcarbyl or germylcarbyl;
T is a bridging group and y is 0 or 1 indicating the absence (y=0) or presence (y=1) of T;
and each X is, independently, a leaving group, or two Xs are joined and bound to the metal atom to form a metallocycle ring, or two Xs are joined to form a chelating ligand, a diene ligand, or an alkylidene.

In at least one embodiment, the catalyst compound is one or more bridged transition metal compounds represented by formula (III):

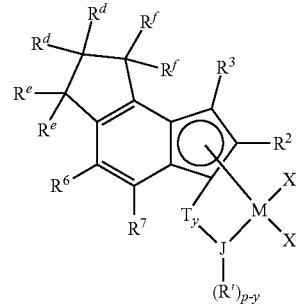

(III)

where M is a group 4 metal (such as Hf, Ti or Zr, preferably Ti);
J is N, O, S or P;
p is 2 when J is N or P, and is 1 when J is O or S (preferably J is N, y=1, and p=2);
each $R^d$, $R^e$ and $R^f$ are independently hydrogen or a $C_1$-$C_{10}$ alkyl (alternately a $C_2$-$C_{10}$ alkyl);
each $R^2$, $R^3$, $R^6$, and $R^7$ is independently hydrogen, or a $C_1$-$C_{50}$ substituted or unsubstituted hydrocarbyl, halocarbyl, silylcarbyl or germylcarbyl;
each R' is, independently, a $C_1$-$C_{100}$ substituted or unsubstituted hydrocarbyl, halocarbyl, silylcarbyl or germylcarbyl;
T is a bridging group and y is 0 or 1 indicating the absence (y=0) or presence (y=1) of T;
and each X is, independently, a leaving group, or two Xs are joined and bound to the metal atom to form a metallocycle ring, or two Xs are joined to form a chelating ligand, a diene ligand, or an alkylidene.

In some embodiments of formulae II and III, y is 1 and T is $(CR^8R^9)_x$, $SiR^8R^9$ or $GeR^8R^9$ where x is 1 or 2, $R^8$ and $R^9$ are independently selected from hydrogen or substituted or unsubstituted hydrocarbyl, halocarbyl, silylcarbyl and germylcarbyl and $R^8$ and $R^9$ may optionally be bonded together to form a ring structure.

In at least one embodiment of the present disclosure, each $R^2$, $R^3$, $R^6$, and $R^7$ is independently hydrogen, or a $C_1$-$C_{50}$ substituted or unsubstituted hydrocarbyl, halocarbyl, silylcarbyl or germylcarbyl, preferably methyl, ethyl, propyl, butyl, pentyl, hexyl, heptyl, octyl, nonyl, decyl, undecyl, and dodecyl or an isomer thereof.

In at least one embodiment of the present disclosure, each $R^2$, $R^3$, $R^4$, and $R^7$ is independently hydrogen, or a $C_1$-$C_{50}$ substituted or unsubstituted hydrocarbyl, halocarbyl, silylcarbyl or germylcarbyl, preferably methyl, ethyl, propyl, butyl, pentyl, hexyl, heptyl, octyl, nonyl, decyl, undecyl, and dodecyl or an isomer thereof.

In at least one embodiment of the present disclosure, each $R^a$ or $R^d$ is independently selected from methyl, ethyl, propyl, butyl, pentyl, hexyl, heptyl, octyl, nonyl, decyl, and isomers thereof, preferably methyl and ethyl, preferably methyl.

In at least one embodiment of the present disclosure, each $R^b$, $R^c$, $R^e$ or $R^f$ is independently selected from hydrogen, methyl, ethyl, propyl, butyl, pentyl, hexyl, heptyl, octyl, nonyl, decyl, and isomers thereof, preferably hydrogen or methyl, preferably hydrogen.

In at least one embodiment of the present disclosure, each $R^a$ is independently selected from methyl, ethyl, propyl, butyl, pentyl, hexyl, heptyl, octyl, nonyl, decyl, and isomers thereof, preferably methyl and ethyl, preferably methyl, and each $R^b$ and $R^c$ are independently selected from hydrogen, methyl, ethyl, propyl, butyl, pentyl, hexyl, heptyl, octyl, nonyl, decyl, and isomers thereof, preferably hydrogen or methyl, preferably hydrogen.

In at least one embodiment of the present disclosure, each $R^d$ is independently selected from hydrogen, methyl, ethyl, propyl, butyl, pentyl, hexyl, heptyl, octyl, nonyl, decyl, and isomers thereof, preferably methyl and ethyl, preferably methyl, and each $R^e$ and $R^f$ are independently selected from hydrogen, methyl, ethyl, propyl, butyl, pentyl, hexyl, heptyl, octyl, nonyl, decyl, and isomers thereof, preferably hydrogen or methyl, preferably hydrogen.

In at least one embodiment of the present disclosure, each $R^a$, $R^b$ and $R^c$ are independently selected from hydrogen, methyl, ethyl, propyl, butyl, pentyl, hexyl, heptyl, octyl, nonyl, decyl, and isomers thereof, preferably hydrogen or methyl.

In at least one embodiment of the present disclosure, each $R^d$, $R^e$ and $R^f$ are independently selected from hydrogen, methyl, ethyl, propyl, butyl, pentyl, hexyl, heptyl, octyl, nonyl, decyl, and isomers thereof, preferably hydrogen or methyl.

In at least one embodiment of the present disclosure, R' is a $C_1$-$C_{100}$ substituted or unsubstituted hydrocarbyl, halocarbyl, or silylcarbyl, preferably methyl, ethyl, propyl, butyl, pentyl, hexyl, heptyl, octyl, nonyl, decyl, undecyl, dodecyl, phenyl or an isomer thereof, preferably t-butyl, neopentyl, cyclohexyl, cyclooctyl, cyclododecyl, adamantyl, or norbornyl.

In at least one embodiment of the present disclosure, T is $CR^8R^9$, $R^8R^9C$—$CR^8R^9$, $SiR^8R^9$ or $GeR^8R^9$ where $R^8$ and $R^9$ are independently selected from hydrogen or substituted or unsubstituted hydrocarbyl, halocarbyl, silylcarbyl and $R^8$ and $R^9$ may optionally be bonded together to form a ring structure, preferably each $R^8$ and $R^9$ is independently methyl, ethyl, propyl, butyl, pentyl, hexyl, heptyl, octyl, nonyl, decyl, benzyl, phenyl, methylphenyl or an isomer thereof, preferably methyl, ethyl, propyl, butyl, or hexyl. When $R^8$ and $R^9$ are optionally bonded together preferred bridges include substituted or unsubstituted phen-1,2-diyl, cyclohex-1,2-diyl, cyclopentamethylenesilylene, cyclotetramethylenesilylene, cyclotrimethylenesilylene and dibenzo[b,d]silolyl. Additionally, optionally any one or more adjacent $R^8$ and/or $R^9$ may join to form a substituted or unsubstituted, saturated, partially unsaturated or aromatic, cyclic or polycyclic substituent along with R'.

In at least one embodiment of the present disclosure, at least one of $R^8$ or $R^9$ is not aryl. In at least one embodiment of the present disclosure, $R^8$ is not aryl. In at least one embodiment of the present disclosure, $R^9$ is not aryl. In at least one embodiment of the present disclosure, $R^8$ and $R^9$ are not aryl.

In at least one embodiment of the present disclosure, $R^8$ and $R^9$ are independently $C_1$-$C_{10}$ alkyl, such as methyl, ethyl, propyl, butyl, pentyl, hexyl, heptyl, octyl, nonyl, decyl, or an isomer thereof.

In at least one embodiment of the present disclosure, each $R^2$, $R^3$, $R^4$, and $R^7$ is independently hydrogen or hydrocarbyl. Each $R^2$, $R^3$, $R^4$, and $R^7$ can be independently hydrogen or a $C_1$-$C_{10}$ alkyl, such as methyl, ethyl, propyl, butyl, pentyl, hexyl, heptyl, octyl, nonyl, decyl, or an isomer thereof.

In at least one embodiment of the present disclosure, each $R^2$, $R^3$, $R^6$, and $R^7$ is independently hydrogen or hydrocarbyl. Each $R^2$, $R^3$, $R^6$, and $R^7$ can be independently hydrogen or a $C_1$-$C_{10}$ alkyl, preferably methyl, ethyl, propyl, butyl, pentyl, hexyl, heptyl, octyl, nonyl, decyl, or an isomer thereof.

In at least one embodiment of the present disclosure, $R^2$ is a $C_1$-$C_{10}$ alkyl and $R^3$, $R^4$, and $R^7$ are hydrogen.

In at least one embodiment of the present disclosure, $R^2$ is a $C_1$-$C_{10}$ alkyl and $R^3$, $R^6$, and $R^7$ are hydrogen.

In at least one embodiment of the present disclosure, $R^2$, $R^3$, $R^4$, and $R^7$ are hydrogen. In at least one embodiment of the present disclosure, $R^2$, $R^3$, $R^6$, and $R^7$ are hydrogen.

In at least one embodiment of the present disclosure, $R^2$ is methyl, ethyl, or an isomer of propyl, butyl, pentyl or hexyl, and $R^3$, $R^4$, and $R^7$ are hydrogen. In at least one embodiment of the present disclosure, $R^2$ is methyl, ethyl, or an isomer of propyl, butyl, pentyl or hexyl, and $R^3$, $R^6$, and $R^7$ are hydrogen.

In at least one embodiment of the present disclosure, $R^2$ is methyl and $R^3$, $R^4$, and $R^7$ are hydrogen. In at least one embodiment of the present disclosure, $R^2$ is methyl and $R^3$, $R^6$, and $R^7$ are hydrogen.

In at least one embodiment of the present disclosure, $R^3$ is hydrogen. In at least one embodiment of the present disclosure, $R^2$ is hydrogen.

In at least one embodiment of the present disclosure, $R^2$ and each $R^a$ is independently a $C_1$-$C_{10}$ alkyl and $R^3$, $R^4$, $R^7$ and each $R^b$ and $R^c$ are hydrogen.

In at least one embodiment of the present disclosure, $R^2$ and each $R^d$ is a $C_1$-$C_{10}$ alkyl and $R^3$, $R^6$, $R^7$ and each $R^e$ and $R^f$ are hydrogen.

In at least one embodiment of the present disclosure, $R^2$ and each $R^a$ is independently a methyl, ethyl, propyl, butyl, pentyl, hexyl, heptyl, octyl, nonyl, decyl, or an isomer thereof, and $R^3$, $R^4$, $R^7$ and each $R^b$ and $R^c$ are hydrogen.

In at least one embodiment of the present disclosure, $R^2$ and each $R^d$ is a methyl, ethyl, propyl, butyl, pentyl, hexyl, heptyl, octyl, nonyl, decyl, or an isomer thereof, and $R^3$, $R^6$, $R^7$ and each $R^e$ and $R^f$ are hydrogen.

In at least one embodiment of the present disclosure, R' is $C_1$-$C_{100}$ or $C_1$-$C_{30}$ substituted or unsubstituted hydrocarbyl.

In at least one embodiment of the present disclosure, R' is $C_1$-$C_{30}$ substituted or unsubstituted alkyl (linear, branched, or cyclic), aryl, alkaryl, or heterocyclic group. In at least one embodiment of the present disclosure, R' is $C_1$-$C_{30}$ linear, branched or cyclic alkyl group.

In at least one embodiment of the present disclosure, R' is methyl, ethyl, or any isomer of propyl, butyl, pentyl, hexyl, heptyl, octyl, nonyl, decyl, undecyl, or dodecyl. In at least one embodiment of the present disclosure, R' is a cyclic or polycyclic hydrocarbyl.

In at least one embodiment of the present disclosure, R' is selected from tert-butyl, neopentyl, cyclohexyl, cycloheptyl, cyclooctyl, cyclononyl, cyclodecyl, cycloundecyl, cyclododecyl, adamantyl, and norbornyl. In at least one embodiment, R' is tert-butyl.

In at least one embodiment of the present disclosure, $R^i$ is selected from tert-butyl, neopentyl, cyclohexyl, cycloheptyl, cyclooctyl, cyclononyl, cyclodecyl, cycloundecyl, cyclododecyl, adamantyl, and norbornyl. In at least one embodiment, R' is tert-butyl.

In at least one embodiment of the present disclosure, T is selected from diphenylmethylene, dimethylmethylene, 1,2-ethylene, phen-1,2-diyl, cyclohex-1,2-diyl cyclotrimethylenesilylene, cyclotetramethylenesilylene, cyclopentamethylenesilylene, dibenzo[b,d]silolyl, dimethylsilylene, diethylsilylene, methylethylsilylene, and dipropylsilylene.

In at least one embodiment of the present disclosure, each $R^a$ is independently methyl, ethyl, propyl, butyl, pentyl or hexyl. In at least one embodiment of the present disclosure, each $R^a$ is independently methyl or ethyl. Each $R^a$ can be methyl.

In at least one embodiment of the present disclosure, each $R^d$ is independently methyl, ethyl, propyl, butyl, pentyl or hexyl. In at least one embodiment of the present disclosure, each $R^d$ is independently methyl or ethyl. Each $R^d$ can be methyl.

In at least one embodiment of the present disclosure, each $R^d$ and each $R^e$ and $R^f$ are independently hydrogen, methyl, ethyl, propyl, butyl, pentyl or hexyl. In at least one embodiment of the present disclosure, each $R^d$ is independently hydrogen, methyl, or ethyl.

In at least one embodiment of the present disclosure, each $R^b$ and $R^c$ is hydrogen. In at least one embodiment of the present disclosure, each $R^e$ and $R^f$ is hydrogen.

In at least one embodiment of the present disclosure, each X is hydrocarbyl, halocarbyl, or substituted hydrocarbyl or halocarbyl.

In at least one embodiment of the present disclosure, X is methyl, benzyl, or halo where halo includes fluoro, chloro, bromo and iodido.

In at least one embodiment of the present disclose, both X are joined together to form a $C_4$-$C_{20}$ diene ligand such as 1,3-butadiene, 1,3-pentadiene, 2-methyl-1,3-pentadiene, 2,4-dimethylpentadiene and the like.

In at least one embodiment of formula (II) of the present disclosure: 1) $R^3$ and/or $R^4$ are not aryl or substituted aryl, 2) $R^3$ is not directly bonded to a group 15 or 16 heteroatom, and 3) adjacent $R^4$, $R^c$, $R^a$, $R^b$, or $R^7$ do not join together to form a fused ring system, and 4) each $R^a$ is a $C_1$ to $C_{10}$ alkyl (preferably methyl, ethyl, propyl, butyl, pentyl, hexyl, heptyl, octyl, nonyl, decyl, or an isomer thereof).

In a preferred embodiment of the present disclosure, T of any of formulas (I)—(III) is represented by the formula $ER^g_2$ or $(ER^g_2)_2$, where E is C, Si, or Ge, and each $R^g$ is, independently, hydrogen, halogen, $C_1$ to $C_{20}$ hydrocarbyl (such as methyl, ethyl, propyl, butyl, pentyl, hexyl, heptyl, octyl, nonyl, decyl, undecyl, or dodecyl) or a $C_1$ to $C_{20}$ substituted hydrocarbyl, and two $R^g$ can form a cyclic structure including aromatic, partially saturated, or saturated cyclic or fused ring system. Preferably, T is a bridging group comprising carbon or silica, such as dialkylsilyl, preferably T is selected from —CH$_2$—, —CH$_2$CH$_2$—, —C(CH$_3$)$_2$—, Si(Me)$_2$, cyclotrimethylenesilylene (—Si(CH$_2$)$_3$—), cyclopentamethylenesilylene (—Si(CH$_2$)$_5$—) and cyclotetramethylenesilylene (—Si(CH$_2$)$_4$—).

In at least one embodiment, a catalyst compound is one or more of:
dimethylsilylene(2,6,6-trimethyl-1,5,6,7-tetrahydro-s-indacen-1-yl)(t-butylamido)M(R)$_2$;
dimethylsilylene(6,6-dimethyl-1,5,6,7-tetrahydro-s-indacen-1-yl)(t-butylamido)M(R)$_2$;
dimethylsilylene(2,7,7-trimethyl-3,6,7,8-tetrahydro-as-indacen-3-yl)(t-butylamido)M(R)$_2$;
dimethylsilylene(7,7-dimethyl-3,6,7,8-tetrahydro-as-indacen-3-yl)(t-butylamido)M(R)$_2$;
dimethylsilylene(2,6,6-trimethyl-1,5,6,7-tetrahydro-s-indacen-1-yl)(cyclododecylamido)M(R)$_2$;
dimethylsilylene(6,6-dimethyl-1,5,6,7-tetrahydro-s-indacen-1-yl)(cyclododecylamido)M(R)$_2$;
dimethylsilylene(2,7,7-trimethyl-3,6,7,8-tetrahydro-as-indacen-3-yl)(cyclododecylamido)M(R)$_2$;
dimethylsilylene(7,7-dimethyl-3,6,7,8-tetrahydro-as-indacen-3-yl)(cyclododecylamido)M(R)$_2$;
dimethylsilylene(2,6,6-trimethyl-1,5,6,7-tetrahydro-s-indacen-1-yl)(cyclohexylamido)M(R)$_2$;
dimethylsilylene(6,6-dimethyl-1,5,6,7-tetrahydro-s-indacen-1-yl)(cyclohexylamido)M(R)$_2$;
dimethylsilylene(2,7,7-trimethyl-3,6,7,8-tetrahydro-as-indacen-3-yl)(cyclohexylamido)M(R)$_2$;
dimethylsilylene(7,7-dimethyl-3,6,7,8-tetrahydro-as-indacen-3-yl)(cyclohexylamido)M(R)$_2$;
dimethylsilylene(2,6,6-trimethyl-1,5,6,7-tetrahydro-s-indacen-1-yl)(adamantylamido)M(R)$_2$;
dimethylsilylene(6,6-dimethyl-1,5,6,7-tetrahydro-s-indacen-1-yl)(adamantylamido)M(R)$_2$;
dimethylsilylene(2,7,7-trimethyl-3,6,7,8-tetrahydro-as-indacen-3-yl)(adamantylamido)M(R)$_2$;
dimethylsilylene(7,7-dimethyl-3,6,7,8-tetrahydro-as-indacen-3-yl)(adamantylamido)M(R)$_2$;
dimethylsilylene(2,6,6-trimethyl-1,5,6,7-tetrahydro-s-indacen-1-yl)(neopentylamido)M(R)$_2$;
dimethylsilylene(6,6-dimethyl-1,5,6,7-tetrahydro-s-indacen-1-yl)(neopentylamido)M(R)$_2$;
dimethylsilylene(2,7,7-trimethyl-3,6,7,8-tetrahydro-as-indacen-3-yl)(neopentylamido)M(R)$_2$;
dimethylsilylene(7,7-dimethyl-3,6,7,8-tetrahydro-as-indacen-3-yl)(neopentylamido)M(R)$_2$;
dimethylsilylene(2-methyl-6,6-diethyl-1,5,6,7-tetrahydro-s-indacen-1-yl)(t-butylamido)M(R)$_2$;
dimethylsilylene(6,6-diethyl-1,5,6,7-tetrahydro-s-indacen-1-yl)(t-butylamido)M(R)$_2$;
dimethylsilylene(2-methyl-7,7-diethyl-3,6,7,8-tetrahydro-as-indacen-3-yl)(t-butylamido)M(R)$_2$;
dimethylsilylene(7,7-diethyl-3,6,7,8-tetrahydro-as-indacen-3-yl)(t-butylamido)M(R)$_2$;
dimethylsilylene(2-methyl-6,6-diethyl-1,5,6,7-tetrahydro-s-indacen-1-yl)(cyclododecylamido)M(R)$_2$;
dimethylsilylene(6,6-diethyl-1,5,6,7-tetrahydro-s-indacen-1-yl)(cyclododecylamido)M(R)$_2$;
dimethylsilylene(2-methyl-7,7-diethyl-3,6,7,8-tetrahydro-as-indacen-3-yl)(cyclododecylamido)M(R)$_2$;
dimethylsilylene(7,7-dimethyl-3,6,7,8-tetrahydro-as-indacen-3-yl)(cyclododecylamido)M(R)$_2$;
diethylsilylene(2,6,6-trimethyl-1,5,6,7-tetrahydro-s-indacen-1-yl)(t-butylamido)M(R)$_2$;
diethylsilylene(6,6-dimethyl-1,5,6,7-tetrahydro-s-indacen-1-yl)(t-butylamido)M(R)$_2$;
diethylsilylene(2,7,7-trimethyl-3,6,7,8-tetrahydro-as-indacen-3-yl)(t-butylamido)M(R)$_2$;
diethylsilylene(7,7-dimethyl-3,6,7,8-tetrahydro-as-indacen-3-yl)(t-butylamido)M(R)$_2$;
dimethylsilylene(2-methyl-3,6,7,8-tetrahydro-as-indacen-3-yl)(cyclohexylamido)M(R)$_2$;
dimethylsilylene(2-methyl-3,6,7,8-tetrahydro-as-indacen-3-yl)(cyclododecylamido)M(R)$_2$;
dimethylsilylene(2-methyl-3,6,7,8-tetrahydro-as-indacen-3-yl)(adamantylamido)M(R)$_2$; and dimethylsilylene(2-methyl-3,6,7,8-tetrahydro-as-indacen-3-yl)(t-butylamido)M(R)$_2$,
where M is selected from Ti, Zr, and Hf and R is selected from halogen or $C_1$ to $C_5$ alkyl, preferably R is a methyl group or a halogen group, preferably M is Ti.

In alternative embodiments, a catalyst system can include two or more different transition metal compounds. For purposes of the present disclosure one transition metal compound is considered different from another if they differ by at least one atom. For example "Me$_2$Si(2,7,7-Me$_3$-3,6,7,8-tetrahydro-as-indacen-3-yl)(cyclohexylamido)TiCl$_2$" is different from Me$_2$Si(2,7,7-Me$_3$-3,6,7,8-tetrahydro-as-indacen-3-yl)(n-butylamido)TiCl$_2$" which is different from Me$_2$Si(2,7,7-Me$_3$-3,6,7,8-tetrahydro-as-indacen-3-yl)(n-butylamido)HfCl$_2$.

In some embodiments, formulae I through III are referred to as mono-tetrahydroindacenyl compounds, precatalysts and/or catalysts.

In at least one embodiment, one mono-tetrahydroindacenyl compound as described herein is used in the catalyst system.

Activators

The terms "cocatalyst" and "activator" are used herein interchangeably and include a compound which can activate any one of the catalyst compounds described above by converting the neutral catalyst compound to a catalytically active catalyst compound cation. Non-limiting activators, for example, include alumoxanes, aluminum alkyls, ionizing activators, which may be neutral or ionic, and conventional-type cocatalysts. Preferred activators typically include non-coordinating anion compounds, alumoxane compounds, modified alumoxane compounds, and ionizing anion precursor compounds that abstract a reactive, σ-bound, metal ligand making the metal complex cationic and providing a charge-balancing noncoordinating or weakly coordinating anion.

Alumoxane Activators

Alumoxane activators are utilized as activators in the catalyst systems described herein. Alumoxanes are generally oligomeric compounds containing —Al($R^1$)—O— sub-units, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584).

When the activator is an alumoxane (modified or unmodified), some embodiments select the maximum amount of activator typically at up to a 5000-fold molar excess Al/M over the catalyst compound (per metal catalytic site). The minimum activator-to-catalyst-compound is a 1:1 molar ratio. Alternate preferred ranges include from 1:1 to 500:1, alternately from 1:1 to 200:1, alternately from 1:1 to 100:1, or alternately from 1:1 to 50:1.

Non Coordinating Anion Activators

Non-coordinating anion activators may also be used herein. The term "non-coordinating anion" (NCA) means an anion which either does not coordinate to a cation or which is only weakly coordinated to a cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with the present disclosure are those that are compatible, stabilize the transition metal cation in the sense of balancing its ionic charge at +1, and yet retain sufficient lability to permit displacement during polymerization.

It is within the scope of the present disclosure to use an ionizing activator, neutral or ionic, such as tri (n-butyl) ammonium tetrakis (pentafluorophenyl) borate, N,N-dimethylanilinium tetrakis(pentafluorophenyl)borate, N-dimethylanilinium tetrakis(perfluoronaphthyl)borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), alone or in combination with the alumoxane or modified alumoxane activators. It is also within the scope of the present disclosure to use neutral or ionic activators in combination with the alumoxane or modified alumoxane activators.

The catalyst systems of the present disclosure can include at least one non-coordinating anion (NCA) activator. Specifically the catalyst systems may include NCAs which either do not coordinate to a cation or which only weakly coordinate to a cation thereby remaining sufficiently labile to be displaced during polymerization.

In a preferred embodiment boron containing NCA activators represented by the formula below can be used:

$$Z_d^+(A^{d-})$$

where: Z is (L-H) or a reducible Lewis acid; L is a neutral Lewis base; H is hydrogen; (L-H) is a Bronsted acid; $A^{d-}$ is a boron containing non-coordinating anion having the charge d-; d is 1, 2, or 3.

The cation component, $Z_d^+$ may include Bronsted acids such as protons or protonated Lewis bases or reducible Lewis acids capable of protonating or abstracting a moiety, such as an alkyl or aryl, from the bulky ligand metallocene containing transition metal catalyst precursor, resulting in a cationic transition metal species.

The activating cation $Z_d^+$ may also be a moiety such as silver, tropylium, carboniums, ferroceniums and mixtures, preferably carboniums and ferroceniums. Most preferably $Z_d^+$ is triphenyl carbonium. Preferred reducible Lewis acids can be any triaryl carbonium (where the aryl can be substituted or unsubstituted, such as those represented by the formula: ($Ar_3C^+$), where Ar is aryl or aryl substituted with a heteroatom, a $C_1$ to $C_{40}$ hydrocarbyl, or a substituted $C_1$ to $C_{40}$ hydrocarbyl), preferably the reducible Lewis acids as "Z" include those represented by the formula: ($Ph_3C$), where Ph is a substituted or unsubstituted phenyl, preferably substituted with $C_1$ to $C_{40}$ hydrocarbyls or substituted a $C_1$ to $C_{40}$ hydrocarbyls, preferably $C_1$ to $C_{20}$ alkyls or aromatics or substituted $C_1$ to $C_{20}$ alkyls or aromatics, preferably Z is a triphenylcarbonium.

When $Z_d^+$ is the activating cation (L-H)$_d^+$, it is preferably a Bronsted acid, capable of donating a proton to the transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxomiuns from ethers such as dimethyl ether diethyl ether, tetrahydrofuran and dioxane, sulfoniums from thioethers, such as diethyl thioethers, tetrahydrothiophene, and mixtures thereof.

The anion component $A^{d-}$ includes those having the formula [$M^{k+}Q_n$]$^{d-}$ wherein k is 1, 2, or 3; n is 1, 2, 3, 4, 5, or 6 (preferably 1, 2, 3, or 4); n–k=d; M is an element selected from group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895, which is fully incorporated herein by reference.

Illustrative, but not limiting examples of boron compounds which may be used as an activating cocatalyst are the compounds described as (and particularly those specifically listed as) activators in U.S. Pat. No. 8,658,556, which is incorporated by reference herein.

Most preferably, the ionic activator $Z_d^+$ ($A^{d-}$) is one or more of N,N-dimethylanilinium tetrakis(pentafluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, or triphenylcarbenium tetra(perfluorophenyl)borate.

Bulky activators are also useful herein as NCAs. "Bulky activator" as used herein refers to anionic activators represented by the formula:

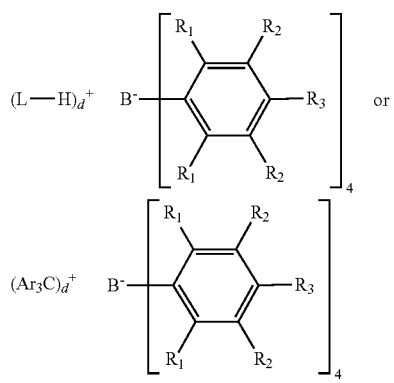

where: each $R_1$ is, independently, a halide, preferably a fluoride; Ar is substituted or unsubstituted aryl group (preferably a substituted or unsubstituted phenyl), preferably substituted with $C_1$ to $C_{40}$ hydrocarbyls, preferably $C_1$ to $C_{20}$ alkyls or aromatics; each $R_2$ is, independently, a halide, a $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_2$ is a fluoride or a perfluorinated phenyl group); each $R_3$ is a halide, $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_3$ is a fluoride or a $C_6$ perfluorinated aromatic hydrocarbyl group); wherein $R_2$ and $R_3$ can form one or more saturated or unsaturated, substituted or unsubstituted rings (preferably $R_2$ and $R_3$ form a perfluorinated phenyl ring); and L is an neutral Lewis base; (L-H)$^+$ is a Bronsted acid; d is 1, 2, or 3; wherein the anion has a molecular weight of greater than 1020 g/mol; wherein at least three of the substituents on the B atom each have a molecular volume of greater than 250 cubic Å, alternately greater than 300 cubic Å, or alternately greater than 500 cubic Å.

Preferably $(Ar_3C)_d^+$ is $(Ph_3C)_d^+$, where Ph is a substituted or unsubstituted phenyl, preferably substituted with $C_1$ to $C_{40}$ hydrocarbyls or substituted $C_1$ to $C_{40}$ hydrocarbyls, preferably $C_1$ to $C_{20}$ alkyls or aromatics or substituted $C_1$ to $C_{20}$ alkyls or aromatics.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple "Back of the Envelope" Method for Estimating the Densities and Molecular Volumes of Liquids and Solids," Journal of Chemical Education, Vol. 71, No. 11, November 1994, pp. 962-964. Molecular volume (MV), in units of cubic Å, is calculated using the formula: $MV=8.3V_S$, where $V_S$ is the scaled volume. $V_S$ is the sum of the relative volumes of the constituent atoms, and is calculated from the molecular formula of the substituent using the following table of relative volumes. For fused rings, the $V_S$ is decreased by 7.5% per fused ring.

| Element | Relative Volume |
|---|---|
| H | 1 |
| $1^{st}$ short period, Li to F | 2 |
| $2^{nd}$ short period, Na to Cl | 4 |
| $1^{st}$ long period, K to Br | 5 |
| $2^{nd}$ long period, Rb to I | 7.5 |
| $3^{rd}$ long period, Cs to Bi | 9 |

For a list of particularly useful Bulky activators please see U.S. Pat. No. 8,658,556, which is incorporated by reference herein.

In another embodiment, one or more of the NCA activators is chosen from the activators described in U.S. Pat. No. 6,211,105.

Preferred activators include N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, Me$_3$NH$^+$][B(C$_6$F$_5$)$_4^-$]; 1-(4-(tris(pentafluorophenyl)borate)-2,3,5,6-tetrafluorophenyl)pyrrolidinium; and tetrakis(pentafluorophenyl)borate, and 4-(tris(pentafluorophenyl)borate)-2,3,5,6-tetrafluoropyridine.

In at least one embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate).

In another embodiment, the activator comprises one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkylammonium tetrakis-(2,3,4,6-tetrafluorophenyl) borate, N,N-dialkylanilinium tetrakis-(2,3, 4,6-tetrafluorophenyl)borate, trialkylammonium tetrakis (perfluoronaphthyl)borate, N,N-dialkylanilinium tetrakis (perfluoronaphthyl)borate, trialkylammonium tetrakis (perfluorobiphenyl)borate, N,N-dialkylanilinium tetrakis (perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl) phenyl)borate, di-(i-propyl)ammonium tetrakis(pentafluorophenyl)borate, di(hydrogenated tallow)methylammonium [tetrakis(pentafluorophenyl)borate], di(octadecyl) methylammonium[tetrakis(pentafluorophenyl)borate]. N-methyl-4-nonadecyl-N-octadecylanilinium [tetrakis(perfluorophenyl)borate], N-methyl-4-hexadecyl-N-octadecylanilinium [tetrakis(perfluorophenyl)borate], di(hydrogenated tallow)methylammonium[tetrakis(perfluoronaphthyl) borate], di(octadecyl)methylammonium[tetrakis (perfluoronaphthyl)borate], N-methyl-4-nonadecyl-N-octadecylanilinium [tetrakis(perfluoronaphthyl)borate], N-methyl-4-hexadecyl-N-octadecylanilinium [tetrakis(perfluoronaphthyl)borate] (where alkyl is methyl, ethyl, propyl, n-butyl, sec-butyl, or t-butyl).

In preferred embodiments of the invention, N-methyl-4-nonadecyl-N-octadecylanilinium [tetrakis(perfluoronaphthyl)borate] is a preferred activator.

In preferred embodiments of the invention, di(octadecyl) methylammonium[tetrakis(perfluoronaphthyl)borate] is a preferred activator.

In preferred embodiments of the invention, N,N-dimethylanilinium tetrakis(perfluoronaphthyl)borate is a preferred activator.

In preferred embodiments of the invention, di(hydrogenated tallow)methylammonium[tetrakis(perfluoronaphthyl) borate] is a preferred activator.

The typical NCA activator-to-catalyst ratio, e.g., all NCA activators-to-catalyst ratio is about a 1:1 molar ratio. Alternate preferred ranges include from 0.1:1 to 100:1, alternately from 0.5:1 to 200:1, alternately from 1:1 to 500:1 alternately from 1:1 to 1000:1. A particularly useful range is from 0.5:1 to 10:1, preferably 1:1 to 5:1.

Activators useful herein also include those described in U.S. Pat. No. 7,247,687 at column 169, line 50 to column 174, line 43, particularly column 172, line 24 to column 173, line 53.

Additional useful activators and the synthesis thereof, are described in U.S. Ser. No. 16/394,166 filed Apr. 25, 2019, U.S. Ser. No. 16/394,186, filed Apr. 25, 2019, and U.S. Ser. No. 16/394,197, filed Apr. 25, 2019, which are incorporated by reference herein.

It is also within the scope of the present disclosure that the catalyst compounds can be combined with combinations of alumoxanes and NCA's (see for example, U.S. Pat. Nos. 5,153,157, 5,453,410, EP 0 573 120 B1, WO 94/07928, and WO 95/14044 which discuss the use of an alumoxane in combination with an ionizing activator).

Optional Scavengers or Co-Activators

In addition to the activator compounds, scavengers, chain transfer agents or co-activators may be used. Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum, and diethyl zinc.

Useful chain transfer agents that may also be used herein are typically a compound represented by the formula $AlR_3$, $ZnR_2$ (where each R is, independently, a $C_1$-$C_8$ aliphatic radical, preferably methyl, ethyl, propyl, butyl, pentyl, hexyl octyl or an isomer thereof) or a combination thereof, such as diethyl zinc, trimethylaluminum, triisobutylaluminum, trioctylaluminum, or a combination thereof.

Supports

In some embodiments, the catalyst compounds described herein may be supported (with or without an activator) by any method effective to support other coordination catalyst systems, effective meaning that the catalyst so prepared can be used for oligomerizing or polymerizing olefin in a heterogeneous process. The catalyst precursor, activator, co-activator if needed, suitable solvent, and support may be added in any order or simultaneously. Typically, the complex and activator may be combined in solvent to form a solution. Then the support is added, and the mixture is stirred for 1 minute to 10 hours. The total solution volume may be greater than the pore volume of the support, but some embodiments limit the total solution volume below that needed to form a gel or slurry (about 90% to 400%, preferably about 100-200% of the pore volume). After stirring, the residual solvent is removed under vacuum, typically at ambient temperature and over 10-16 hours. But greater or lesser times and temperatures are possible.

The complex may also be supported absent the activator; in that case, the activator (and co-activator if needed) is added to a polymerization process's liquid phase. Additionally, two or more different complexes may be supported on the same support. Likewise, two or more activators or an activator and co-activator may be supported on the same support.

Suitable solid particle supports are typically comprised of polymeric or refractory oxide materials, each being preferably porous. A support material can have an average particle size greater than 10 µm for use in embodiments of the present disclosure. VA support material can be a porous support material, such as, talc, inorganic oxides, inorganic chlorides, for example magnesium chloride and resinous support materials such as polystyrene polyolefin or polymeric compounds or any other organic support material and the like. A support material can be an inorganic oxide material including group-2, -3, -4, -5, -13, or -14 metal or metalloid oxides. A catalyst support materials can be silica, alumina, silica-alumina, and their mixtures. Other inorganic oxides may serve either alone or in combination with the silica, alumina, or silica-alumina. These are magnesia, titania, zirconia, and the like. Lewis acidic materials such as montmorillonite and similar clays may also serve as a support. In this case, the support can optionally double as the activator component, however, an additional activator may also be used.

The support material may be pretreated by any number of methods. For example, inorganic oxides may be calcined, chemically treated with dehydroxylating agents such as aluminum alkyls and the like, or both.

As stated above, polymeric carriers will also be suitable in accordance with the present disclosure, see for example the descriptions in WO 95/15815 and U.S. Pat. No. 5,427, 991. The methods disclosed may be used with the catalyst complexes, activators or catalyst systems of the present disclosure to adsorb or absorb them on the polymeric supports, particularly if made up of porous particles, or may be chemically bound through functional groups bound to or in the polymer chains.

Useful supports typically have a surface area of from 10-700 $m^2$/g, a pore volume of 0.1-4.0 cc/g and an average particle size of 10-500 µm. Some embodiments select a surface area of 50-500 $m^2$/g, a pore volume of 0.5-3.5 cc/g, or an average particle size of 20-200 µm. Other embodiments select a surface area of 100-400 m²/g, a pore volume of 0.8-3.0 cc/g, and an average particle size of 30-100 µm. Useful supports typically have a pore size of 10-1000 Angstroms, alternatively 50-500 Angstroms, or 75-350 Angstroms.

The catalyst complexes described herein are generally deposited on the support at a loading level of 10-100 micromoles of complex per gram of solid support; alternately 20-80 micromoles of complex per gram of solid support; or 40-60 micromoles of complex per gram of support. But greater or lesser values may be used provided that the total amount of solid complex does not exceed the support's pore volume.

In an alternative embodiment, catalyst complexes and catalyst systems described herein may be present on a fluorided support, e.g. a support, desirably particulate and porous, which has been treated with at least one inorganic fluorine containing compound. For example, the fluorided support composition can be a silicon dioxide support wherein a portion of the silica hydroxyl groups has been replaced with fluorine or fluorine containing compounds. For example, a useful support herein, is a silica support treated with ammonium hexafluorosilicate and/or ammonium tetrafluoroborate fluorine compounds. Typically the fluorine concentration present on the support is in the range of from 0.1 to 25 wt. %, alternately 0.19 to 19 wt. %, alternately from 0.6 to 3.5 wt. %, based upon the weight of the support.

In an embodiment of the present disclosure, the catalyst system comprises fluorided silica, alkylalumoxane activator, and the bridged monocyclopentadienyl group 4 transition metal compound, where the fluorided support has not been calcined at a temperature of 400° C. or more.

The catalyst compound may be present on a support at 1 to 100 µmol/g supported catalyst, preferably 20-60 mol/g supported catalyst.

The present disclosure also relates to metallocene catalyst systems comprising the reaction product of at least three components: (1) one or more bridged metallocenes having one tetrahydroindacenyl group; (2) one or more alkylalumoxane or NCA activator; and (3) one or more fluorided support compositions, where the fluorided support composition has not been calcined at 400° C. or more, preferably the fluorided support composition has been calcined at a temperature of 100° C. to 395° C., alternately 125° C. to 350° C., alternately 150° C. to 300° C.).

Typically, the fluorided supports described herein are prepared by combining a solution of polar solvent (such as water) and fluorinating agent (such as $SiF_4$ or $(NH_4)_2SiF_6$) with a slurry of support (such as a toluene slurry of silica), then drying until it is free flowing, and optionally, calcining (typically at temperatures over 100° C. for at least 1 hour). The supports are then combined with activator(s) and catalyst compound (separately or together).

For more information on fluorided supports and methods to prepare them, please see U.S. Ser. No. 62/149,799, filed Apr. 20, 2015 (and all cases claiming priority to or the benefit of U.S. Ser. No. 62/149,799); U.S. Ser. No. 62/103,372, filed Jan. 14, 2015 (and all cases claiming priority to or the benefit of U.S. Ser. No. 62/103,372); and PCT/US2015/067582, filed Dec. 28, 2015 which are incorporated by reference herein.

EXPERIMENTAL

Test Methods
Ethylene content is determined using FTIR according to ASTM D3900.
Molecular Weight, Comonomer Composition and Long Chain Branching Determination by Polymer Char GPC-IR Hyphenated with Multiple Detectors (GPC-4D)
The distribution and the moments of molecular weight (Mw, Mn, Mw/Mn, etc.), the comonomer content (C2, C3, C6, etc.) and the long chain branching (g') are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10 µm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1 µm Teflon filter and degassed with an online degasser before entering the GPC instrument. The nominal flow rate is 1.0 mL/min and the nominal injection volume is 200 µL. The whole system including transfer lines, columns, detectors are contained in an oven maintained at 145° C. Given amount of polymer sample is weighed and sealed in a standard vial with 80 µL flow marker (Heptane) added to it. After loading the vial in the autosampler, polymer is automatically dissolved in the instrument with 8 mL added TCB solvent. The polymer is dissolved at 160° C. with continuous shaking for about 1 hour. The TCB densities used in concentration calculation are 1.463 g/ml at room temperature and 1.284 g/ml at 145° C. The sample solution concentration is from 0.2 to 2.0 mg/ml, with lower concentrations being used for higher molecular weight samples.

The concentration (c), at each point in the chromatogram is calculated from the baseline-subtracted IR5 broadband signal intensity (I), using the following equation:

$$c = \beta I$$

where β is the mass constant determined with PE or PP standards. The mass recovery is calculated from the ratio of the integrated area of the concentration chromatography over elution volume and the injection mass which is equal to the pre-determined concentration multiplied by injection loop volume.

The conventional molecular weight (IR MW) is determined by combining universal calibration relationship with the column calibration which is performed with a series of monodispersed polystyrene (PS) standards ranging from 700 to 10M. The MW at each elution volume is calculated with following equation.

$$\log M = \frac{\log(K_{PS}/K)}{a+1} + \frac{a_{PS}+1}{a+1} \log M_{PS}$$

where the variables with subscript "PS" stands for polystyrene while those without a subscript are for the test samples. In this method, $\alpha_{PS}=0.67$ and $K_{PS}=0.00017$; while α and K are calculated as published in literature (e.g., T. Sun, P. Brant, R. R. Chance, and W. W. Graessley, Macromolecules, Volume 34, Number 19, pp. 6812-6820, (2001)), except that for purposes of this invention and claims thereto, unless otherwise indicated, α=0.695+(0.01*(wt. fraction propylene)) and K=0.000579−(0.0003502*(wt. fraction propylene)) for ethylene-propylene copolymers and ethylenepropylene-diene terpolymers, α=0.695 and K=0.000579 for linear ethylene polymers, α=0.705 and K=0.0002288 for linear propylene polymers, α=0.695 and K=0.000181 for linear butene polymers, α is 0.695 and K is 0.000579*(1−0.0087*w2b+0.000018*(w2b)^2) for ethylene-butene copolymer where w2b is a bulk weight percent of butene comonomer, α is 0.695 and K is 0.000579*(1−0.0075*w2b) for ethylene-hexene copolymer where w2b is a bulk weight percent of hexene comonomer, and α is 0.695 and K is 0.000579*(1−0.0077*w2b) for ethylene-octene copolymer where w2b is a bulk weight percent of octene comonomer. Concentrations are expressed in g/cm³, molecular weight is expressed in g/mole, and intrinsic viscosity (hence K in the Mark-Houwink equation) is expressed in dL/g unless otherwise noted. Values used for certain propylene-ethylene-ENB polymers prepared herein are shown below. For purposes of this invention, the wt. fraction propylene for ethylene-propylene and ethylene-propylene-diene polymers is determined by GPC-IR where the "wt. fraction propylene"=(100-wt. % ethylene)/100.

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR. In particular, this provides the methyls per 1000 total carbons ($CH_3$/1000TC) as a function of molecular weight. The short-chain branch (SCB) content per 1000TC (SCB/1000TC) is then computed as a function of molecular weight by applying a chain-end correction to the $CH_3$/1000TC function, assuming each chain to be linear and terminated by a methyl group at each end. The weight % comonomer is then obtained from the following expression in which $f$ is 0.3, 0.4, 0.6, 0.8, and so on for $C_3$, $C_4$, $C_6$, $C_8$, and so on co-monomers, respectively:

$$w2 = f * SCB/1000TC.$$

The bulk composition of the polymer from the GPC-IR and GPC-4D analyses is obtained by considering the entire signals of the $CH_3$ and $CH_2$ channels between the integration limits of the concentration chromatogram. First, the following ratio is obtained $$\text{Bulk } IR \text{ ratio} = \frac{\text{Area of } CH_3 \text{ signal within integration limits}}{\text{Area of } CH_2 \text{ signal within integration limits}}.$$

Then the same calibration of the $CH_3$ and $CH_2$ signal ratio, as mentioned previously in obtaining the $CH_3$/1000TC as a function of molecular weight, is applied to obtain the bulk CH3/1000TC. A bulk methyl chain ends per 1000TC (bulk $CH_3$end/1000TC) is obtained by weight-averaging the chain-end correction over the molecular-weight range. Then $$w2b = f * \text{bulk CH3/1000TC}$$

$$\text{bulk SCB/1000TC} = \text{bulk CH3/1000TC} - \text{bulk CH3end/1000TC}$$

and bulk SCB/1000TC is converted to bulk w2 in the same manner as described above.

The LS detector is the 18-angle Wyatt Technology High Temperature DAWN HELEOSII. The LS molecular weight (M) at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle θ, c is the polymer concentration determined from the IR5 analysis, $A_2$ is the second virial coefficient. $P(\theta)$ is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and λ=665 nm. For analyzing polyethylene homopolymers, ethylene-hexene copolymers, and ethylene-octene copolymers, dn/dc=0.1048 ml/mg and $A_2$=0.0015; for analyzing ethylene-butene copolymers, dn/dc=0.1048*(1−0.00126*w2) ml/mg and $A_2$=0.0015 where w2 is weight percent butene comonomer. For propylene-ethylene-ENB polymers, dn/dc=0.104−(0.0016*wt. % ENB), wherein the wt. % ENB is measured by FTIR according to ASTM D6047, and $A_2$=0.00060.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_S$, for the solution flowing through the viscometer is calculated from their outputs. The intrinsic viscosity, [η], at each point in the chromatogram is calculated from the following equation:

$$[\eta] = \eta_S/c$$

where c is concentration and was determined from the IR5 broadband channel output. The viscosity MW at each point is calculated from the below equation:

$$M = K_{PS} M^{\alpha_{PS}+1}/[\eta]$$

The branching index ($g'_{VIS}$) is calculated using the output of the GPC-IR5-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits. The branching index $g'_{VIS}$ (also referred to as branching index g') is defined as:

$$g'_{vis} = \frac{[\eta]_{avg}}{k M_v^\alpha}$$

$M_V$ is the viscosity-average molecular weight based on molecular weights determined by LS analysis. α and K are as calculated as published in literature (Sun, T. et al. *Macromolecules* 2001, 34, 6812), except for the α's and K's defined above.

All the concentrations are expressed in g/cm³, molecular weight is expressed in g/mole, and intrinsic viscosity is expressed in dL/g unless otherwise noted.

In event of conflict between molecular weights (e.g., LS, IR or VIS) the IR molecular weights shall be used.

Molecular Weight, Comonomer Composition and Long Chain Branching Determination by (GPC-3D) with Multiple Detectors Molecular weights (number average molecular weight (Mn), weight average molecular weight (Mw), and z-average molecular weight (Mz)) can be determined using a Polymer Laboratories Model 220 high temperature gel-permeation chromatography size-exclusion chromatography (GPC-SEC) equipped with on-line differential refractive index (DRI), light scattering (LS), and viscometer (VIS) detectors. Three Polymer Laboratories PLgel 10 m Mixed-B columns are used for separation using a flow rate of 0.54 ml/min and a nominal injection volume of 300 μL. The detectors and columns are contained in an oven maintained at 135° C. The stream emerging from the SEC columns is directed into the miniDAWN (Wyatt Technology, Inc.) optical flow cell and then into the DRI detector. The viscometer is inside the SEC oven, positioned after the DRI detector. The details of these detectors as well as their calibrations are described by, for example, T. Sun, P. Brant, R. R. Chance, and W. W. Graessley. Macromolecules, vol. 34(19), pp. 6812-6820, (2001).

Solvent for the SEC experiment can be prepared by dissolving 6 grams of butylated hydroxy toluene (BHT) as an antioxidant in 4 liters of Aldrich reagent grade 1, 2, 4-trichlorobenzene (TCB). The TCB mixture is then filtered through a 0.7 micrometer glass pre-filter and subsequently through a 0.1 micrometer Teflon filter. The TCB is then degassed with an online degasser before entering the SEC. Polymer solutions are prepared by placing dry polymer in a glass container, adding the desired amount of BHT stabilized TCB, then heating the mixture at 160° C. with continuous agitation for about 2 hours. All quantities are measured gravimetrically. The TCB densities used to express the polymer concentration in mass/volume units can be 1.463 g/mL at 22° C. and 1.324 g/mL at 135° C. The injection concentration can be from 1 mg/mL to 2 mg/mL, with lower concentrations being used for higher molecular weight samples. Prior to running each sample the DRI detector and the injector should be purged. Flow rate in the apparatus can then be increased to 0.5 mL/minute, and the DRI is allowed to stabilize for 8 to 9 hours before injecting the first sample. The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI with a series of mono-dispersed polystyrene standards with molecular weight ranging from 600 to 10M, and (dn/dc) is the refractive index increment for the system. The refractive index, n=1.500 for TCB at 145° C. and λ=690 nm. For purposes of the present disclosure and the claims thereto (dn/dc)=0.1048 for ethylene-propylene copolymers, and (dn/dc)=0.1048−0.0016ENB for EPDM comprising ENB as the diene, where ENB is the ENB content in wt % in the ethylene-propylene-diene terpolymer. Where other non-conjugated polyenes are used instead of (or in addition to) ENB, the ENB is taken as weight percent of total non-conjugated polyenes. The value (dn/dc) is otherwise taken as 0.1 for other polymers and copolymers, including PEDM terpolymers. Units of parameters used throughout this description of the SEC method are: concentration is expressed in g/cm³, molecular weight is expressed in g/mol, and intrinsic viscosity is expressed in dL/g.

The light scattering (LS) detector can be, for example, a high temperature miniDAWN (Wyatt Technology, Inc.). The primary components are an optical flow cell, a 30 mW, 690 nm laser diode light source, and an array of three photodiodes placed at collection angles of 45°, 90°, and 135°. The molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{M P(\theta)} + 2 A_2 c$$

Here, $\Delta R(\theta)$ is the measured excess Rayleigh scattering intensity at scattering angle θ, c is the polymer concentration determined from the DRI analysis, $A_2$ is the second virial coefficient (for purposes of the present disclosure, $A_2$=0.0015 for ethylene homopolymer and $A_2$=0.0015−0.00001EE for ethylene-propylene copolymers, where EE is the ethylene content in weight percent in the ethylene-propylene copolymer. $P(\theta)$ is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and λ=690 nm.

Differential Scanning Calorimetry

Differential Scanning Calorimetry (DSC) was used to determine glass transition temperature (Tg) of the α-olefin-ethylene polymer according to ASTM D3418-03. Melting temperature (Tm), and heat of fusion (Hf) are also determined by DSC. DSC data were obtained using a TA Instruments model Q200 machine. Samples weighing approximately 5-10 mg were kept in an aluminum sample pan and hermetically sealed. These were gradually heated to 200° C. at a rate of 10° C./minute and thereafter, held at 200° C. for 2 minutes. They were subsequently cooled to −90° C. at a rate of 10° C./minute and held isothermally for 2 minutes at −90° C. This was followed by a second heating cycle wherein the samples were heated to 200° C. at 10° C./minute. Both the first and second cycle thermal events were recorded.

During the second heating cycle, appearance of melting indicates crystallinity and thus measured heat of fusion is used to compute the crystallinity unless otherwise indicated. The thermal output, recorded as the area under the melting peak of the sample, is a measure of the heat of fusion and may be expressed in Joules per gram of polymer. The melting point is recorded as the temperature of the greatest heat absorption within the range of melting of the sample relative to a baseline measurement for the increasing heat capacity of the polymer as a function of temperature.

The Tg values reported in the table are the values recorded during the second heating cycle. For purposes of the claims, Tg values are to be determined by DSC.

The percent crystallinity is calculated using the formula: [area under the curve (in J/g)/H° (in J/g)]*100, where H° is the ideal heat of fusion for a perfect crystal of the homopolymer of the major monomer component. These values for H° are to be obtained from the *Polymer Handbook, Fourth Edition*, published by John Wiley and Sons, New York 1999, except that a value of 290 J/g is used for H° (polyethylene), a value of 140 J/g is used for H° (polybutene), and a value of 207 J/g is used for H°(polypropylene).

Composition by $^{13}$C NMR $^{13}$C NMR spectroscopy was used to characterize α-olefin-ethylene polymer samples produced in experiments. Unless otherwise indicated the polymer samples for $^{13}$C NMR spectroscopy were dissolved in 1,1,2,2-tetrachloroethane-$d_2$ at 140° C. with a concentration of 67 mg/mL and the samples were recorded at 120° C. using a NMR spectrometer with a $^{13}$C NMR frequency of 125 MHz or greater using a 90° pulse and gated decoupling. Polymer resonance peaks are referenced to the propylene main isotactic peak (mmmm) at 21.83 ppm. Calculations involved in the characterization of polymers by NMR follow the work of Bovey, F. A. (1969) in Polymer Conformation and Configuration, Academic Press, New York and Randall, J. (1977) in Polymer Sequence Determination, Carbon-13 NMR Method, Academic Press, New York.

The tacticity of propylene-ethylene copolymer is measured by $^{13}$C NMR including the concentration of isotactic and syndiotactic diads ([m] and [r]), and triads ([mm] and [rr]). The designation "m" or "r" describes the stereochemistry of pairs of contiguous propylene groups, "m" referring to meso and "r" to racemic. The designation "m" or "r" describes the stereochemistry of pairs of contiguous propylene groups, "m" referring to meso and "r" to racemic.

For polypropylene, the "mm triad tacticity index" of a polymer is a measure of the relative isotacticity of a sequence of three adjacent propylene units connected in a head-to-tail configuration. More specifically, in the present invention, the mm triad tacticity index (also referred to as the "mm Fraction") of a polypropylene homopolymer or copolymer is expressed as the ratio of the number of units of meso tacticity to all of the propylene triads in the copolymer:

$$mm\ \text{Fraction} = \frac{PPP(mm)}{PPP(mm) + PPP(mr) + PPP(rr)}$$

where PPP(mm), PPP(mr) and PPP(rr) denote peak areas derived from the methyl groups of the second units in the possible triad configurations for three head-to-tail propylene units, shown below in Fischer projection diagrams:

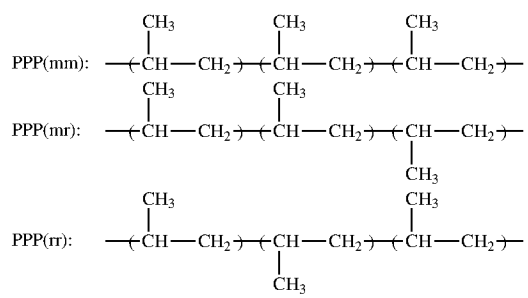

The "rr triad tacticity index" of a polymer is a measure of the relative syndiotacticity of a sequence of three adjacent propylene units connected in a head-to-tail configuration. More specifically, in the present invention, the rr triad tacticity index (also referred to as the "rr Fraction") of a polypropylene copolymer is expressed as the ratio of the number of units of racemic tacticity to all of the propylene triads in the copolymer:

$$rr\ \text{Fraction} = \frac{PPP(rr)}{PPP(mm) + PPP(mr) + PPP(rr)}.$$

The tacticity regions for the $CH_3$ of propylene: PPP(mm), PPP(mr), and PPP(rr) are defined as

| | Chemical shift range (ppm) |
|---|---|
| PPP(mm) | 21.2-22.3 |
| PPP(mr) | 20.4-21.2 |
| PPP(rr) | 19.6-20.4 |

This triad calculation does not account for sequence, chain ends, or regiodefects present within these regions.

Similarly m diads and r diads can be calculated as follows where mm, mr and mr are defined above:

$m = mm + \frac{1}{2}mr$ $r = rr + \frac{1}{2}mr.$

In another embodiment of the invention, the polymers produced herein have regiodefects (as determined by $^{13}$C NMR), based upon the total composition. Three types defects are defined to be the regio defects: 2,1-erythro, 2,1-threo, and 3,1-isomerization, as well as a defect followed by ethylene insertion. The structures and peak assignments for these are given in [L. Resconi, L. Cavallo, A. Fait, and F. Piemontesi, Chem. Rev. 2000, 100, pp. 1253-1345]. The regio defects each give rise to multiple peaks in the carbon NMR spectrum, and these are all integrated and averaged (to the extent that they are resolved from other peaks in the spectrum), to improve the measurement accuracy. The chemical shift offsets of the resolvable resonances used in the analysis are tabulated below. The precise peak positions may shift as a function of NMR solvent choice.

| Regio defect (2,1 defects) | Chemical shift range (ppm) |
|---|---|
| αβ + 2,1-threo + 2,1-erythro | 35.70-34.09 |
| (CH) defect | 34.06-33.88 |
| (CH) defect | 33.72-33.42 |
| βγ | 27.90-27.51 |

The average integral for each defect is divided by the integral for the total area ($CH_3$, CH, $CH_2$), and multiplied by 100 to determine the total defect concentration, reported as mole % regio errors. Definition of species (αβ and βγ) are as defined in Randall in "A Review Of High Resolution Liquid Carbon Nuclear Magnetic Resonance Characterization of Ethylene-Based Polymers", Polymer Reviews, 29:2, 201-5 317 (1989).

Chemical shift assignments for the ethylene-propylene copolymers are described by Randall in "A Review Of High Resolution Liquid Carbon Nuclear Magnetic Resonance Characterization of Ethylene-Based Polymers", Polymer Reviews, 29:2,201-5 317 (1989). The copolymer content, mole and weight %, triad mole fractions [PPP], [EEP], etc, where mole fraction of [PPP] is the CH (PPP) versus the total, and mole fraction of [EEP] is defined by βδ+ signal versus the total as defined in the Randall paper, and diad calculations are also calculated and described in the method by Randall. Calculations for r1r2 were based on the equation $r_1r_2=4*[EE]*[PP]/[EP]^2$; where [EE], [EP], [PP] are the diad molar concentrations; E is ethylene, P is propylene.

The average $CH_2$ sequence length for $6^+$ carbons is calculated by the following equation, $<n(6^+)>=(3*\gamma\delta+\delta^+\delta^+)/(0.5*\gamma\delta)$ with the assignments for γδ and $\delta^+\delta^+$ from the paper by James C. Randall, "Methylene sequence distributions and average sequence lengths in ethylene-propylene copolymers," Macromolecules, 1978, 11, 33-36.

Melt Flow Rate (MFR): MFR is measured according to ASTM D1238 test method, at 230° C. and 2.16 kg load, and is expressed as dg/min or g/10 min. Melt Flow Rate Ratio (MFRR) is the ratio of the MFR measured at a load of 21.6 kg and the MFR measured at a load of 2.16 kg.

Mooney Viscosity (ML): Mooney viscosity (ML) can be determined by ASTM D1646-17 ((1+4), 125° C., 2 $s^{-1}$ shear rate). The Mooney relaxation area (MLRA) data is obtained from the Mooney viscosity measurement when the rubber relaxed after the rotor is stopped. The MLRA is the integrated area under the Mooney torque-relaxation time curve from 1 to 100 seconds.

Room temperature is 23° C. unless otherwise noted.

EXAMPLES

| CAT ID | B |
|---|---|
| CAT Name | dimethylsilylene(2,6,6-trimethyl-1,5,6,7-tetrahydro-s-indacen-1-yl)(tert-butylamido)titanium dimethyl |

| | N,N-dimethylanilinium tetrakis(penta-fluorophenyl)borate | N,N-dimethylanilinium tetrakis(per-fluoronaphthyl)borate |
|---|---|---|
| Activator | | |
| ACT ID | A-1 | A-2 |

Dimethylsilylene(2,6,6-trimethyl-1,5,6,7-tetrahydro-s-indacen-1-yl)(tert-butylamido)titanium dimethyl (Catalyst B) can be prepared as described in U.S. Pat. No. 9,796,795. N,N-dimethylanilinium tetrakis(pentafluorophenyl)borate and N,N-dimethylanilinium tetrakis (perfluoronaphthyl)borate can be purchased from W.R. Grace & Co.

Polymerization Examples

Large Scale Polymerizations: Polymerizations of ethylene and propylene were carried out using a solution process in a 28 liter continuous stirred-tank reactor (autoclave reactor). The autoclave reactor was equipped with an agitator, a pressure controller, and insulation to prevent heat loss. The reactor temperature was controlled by controlling the catalyst feed rates and heat removal was provided by feed chilling. All solvents and monomers were purified over beds of alumina and molecular sieves. The reactor was operated liquid full and at a pressure of 1600 psi. Isohexane was used as a solvent. It was fed into the reactor using a turbine pump and its flow rate was controlled by a mass flow controller downstream. The compressed, liquefied propylene feed was controlled by a mass flow controller. Hydrogen was fed to the reactor by a thermal mass flow controller. Ethylene feed was also controlled by a mass flow controller. The ethylene, propylene and hydrogen (if used) were mixed into the isohexane at separate addition points via a manifold. A 3 wt. % mixture of tri-n-octylaluminum in isohexane was also added to the manifold through a separate line (used as a scavenger) and the combined mixture of monomers, scavenger, and solvent was fed into the reactor through a single tube.

An activated Catalyst B (dimethylsilylene(2,6,6-trimethyl-1,5,6,7-tetrahydro-s-indacen-1-yl)(tert-butylamido)titanium dimethyl) solution was prepared in a 4 L Erlenmeyer flask in a nitrogen-filled glove box. The flask was charged with 4 L of air-free anhydrous toluene, 2.0 g (~0.005 mole) of Catalyst B and 5.7 g Activator A-2 (N,N-dimethylanilinium tetrakis(perfluoronaphthyl)borate), or 1.0 g (~0.0025 mole) of Catalyst B and 1.9 g Activator A-1 (N,N-dimethylanilinium tetrakis(pentafluorophenyl)borate) in a ~1:1 molar ratio to make the solution. After the solids dissolved, with stiffing, the solution was charged into an ISCO pump and metered into the reactor.

The catalyst feed rate was controlled along with the monomer feed rates and reaction temperature, as shown in Table 1, to produce the polymers also described in Table 1. The reactor product stream was treated with trace amounts of methanol to halt the polymerization. The mixture was then freed from solvent via a low-pressure flash separation, treated with Irganox™ 1076 then subjected to a devolatilizing extruder process. The dried polymer was then pelletized.

Medium Scale Polymerizations:

Polymerizations were carried out in a continuous stirred tank reactor system. A 1-liter Autoclave reactor was equipped with a stirrer, a pressure controller, and a water cooling/steam heating element with a temperature controller. The reactor was operated in liquid fill condition at a reactor pressure in excess of the bubbling point pressure of the reactant mixture, keeping the reactants in liquid phase. Isohexane and propylene were pumped into the reactors by Pulsa feed pumps. All flow rates of liquid were controlled using Coriolis mass flow controller (Quantim series from Brooks). Ethylene and $H_2$ (if used) flowed as a gas under its own pressure through a Brooks flow controller where the measurement is in standard liters per minute (SLMP). Monomers (e.g., ethylene and propylene) and $H_2$ feeds were combined into one stream and then mixed with isohexane stream. The mixture was then fed to the reactor through a single line. Isohexane (used as solvent), toluene and monomers (e.g., ethylene and propylene) were purified over beds of alumina and molecular sieves. Scavenger solution was also added to the combined solvent and monomer stream just before it entered the reactor to further reduce any catalyst poisons.

The metallocene used was Catalyst B (dimethylsilylene (2,6,6-trimethyl-1,5,6,7-tetrahydro-s-indacen-1-yl)(tert-butylamido)titanium dimethyl). The catalyst was pre-activated with activator, A-1, N,N-dimethylanilinium tetrakis (pentafluorophenyl)borate at a molar ratio of about 1:1 in 900 ml of toluene. Typical catalyst concentrations were 2.203E-07 mol/ml. Catalyst solution was fed to the reactor using an ISCO syringe pump through a separated line.

The polymer produced in the reactor exited through a back pressure control valve that reduced the pressure to atmospheric. This caused the unconverted monomers in the solution to flash into a vapor phase which was vented from the top of a vapor liquid separator. The liquid phase, comprising mainly polymer and solvent, was collected for polymer recovery. The collected samples were first air-dried in a hood to evaporate most of the solvent, and then dried in a vacuum oven at a temperature of about 90° C. for about 12 hours. The vacuum oven dried samples were weighed to obtain yields.

Polymerization reaction conditions and catalyst used are set forth below in Table 1 (large scale polymerizations) and Table 2 (medium scale polymerizations). Polymer characterization is set forth in Tables 3-7 below. Example 35 is a comparative example with higher ethylene content.

TABLE 1

Ethylene-propylene polymerization run conditions in large reactor.

| Ex# | Act ID | Rxr Temp (° C.) | C2 (kg/hr) | C3 (g/min) | Cat feed rate (mol/min) |
|---|---|---|---|---|---|
| 1 | A-1 | 80 | 1.56 | 326.7 | 1.57E−06 |
| 2 | A-1 | 80 | 0.84 | 290.2 | 2.19E−06 |
| 3 | A-1 | 80 | 0.84 | 290.2 | 2.13E−06 |
| 4 | A-1 | 80 | 0.84 | 290.2 | 1.89E−06 |
| 5 | A-1 | 80 | 0.84 | 290.2 | 2.37E−06 |
| 6 | A-1 | 80 | 0.84 | 290.2 | 1.85E−06 |
| 7 | A-2 | 125 | 3.92 | 199.0 | 1.11E−06 |
| 8 | A-2 | 135 | 3.92 | 199.0 | 1.80E−06 |
| 9 | A-2 | 145 | 3.92 | 199.0 | 3.03E−06 |
| 10 | A-2 | 145 | 3.92 | 199.0 | 3.43E−06 |
| 11 | A-2 | 142 | 2.11 | 262.7 | 4.17E−06 |
| 12 | A-2 | 139 | 2.11 | 262.7 | 3.37E−06 |
| 13 | A-2 | 130 | 2.11 | 262.7 | 1.80E−06 |
| 14 | A-2 | 130 | 2.11 | 262.7 | 1.59E−06 |
| 15 | A-2 | 130 | 2.11 | 262.6 | 1.56E−06 |
| 16 | A-2 | 125 | 2.11 | 262.7 | 1.26E−06 |
| 17 | A-2 | 110 | 0.84 | 391.8 | 1.43E−06 |

Ethylene-propylene polymerization runs conditions in large reactor.

| Ex# | Polymer rate (g/min) | Cat eff. (g/g) | C2 conv (%) | C3 conv (%) |
|---|---|---|---|---|
| 1 | 138.3 | 217,848 | 64 | 37 |
| 2 | 138.5 | 156,941 | 70 | 44 |
| 3 | 138.0 | 160,465 | 70 | 44 |
| 4 | 138.5 | 181,639 | 73 | 44 |
| 5 | 137.2 | 143,255 | 68 | 44 |
| 6 | 138.8 | 185,730 | 73 | 44 |
| 7 | 121.8 | 273,304 | 65 | 40 |
| 8 | 119.5 | 164,446 | 65 | 39 |
| 9 | 117.7 | 96,265 | 64 | 38 |
| 10 | 117.6 | 85,171 | 65 | 38 |
| 11 | 118.6 | 71,449 | 68 | 36 |
| 12 | 118.8 | 88,838 | 67 | 36 |
| 13 | 120.0 | 165,592 | 67 | 37 |
| 14 | 120.3 | 187,660 | 65 | 37 |
| 15 | 119.3 | 190,004 | 70 | 36 |
| 16 | 121.4 | 239,144 | 65 | 37 |
| 17 | 155.0 | 268,540 | 64 | 37 |

*Reactor pressure was 1600 psig and scavenger feed rate is 0.015 kg/hr for all runs

TABLE 2

Ethylene-propylene polymerization run conditions in medium size reactor.

| Ex# | Act ID | Rxr Temp (° C.) | Pressure (psig) | C2 (SLPM) | C3 (g/min) | Cat B rate (mol/min) |
|---|---|---|---|---|---|---|
| 18 | A-1 | 100 | 350 | 0.5 | 27 | 1.0E−07 |
| 19 | A-1 | 80 | 350 | 0.5 | 27 | 3.4E−08 |
| 20 | A-1 | 60 | 350 | 0.5 | 27 | 3.1E−08 |
| 21 | A-1 | 100 | 350 | 0.7 | 27 | 4.5E−08 |
| 22 | A-1 | 80 | 350 | 0.7 | 27 | 3.4E−08 |
| 23 | A-1 | 60 | 350 | 0.7 | 27 | 1.4E−08 |
| 24 | A-1 | 120 | 350 | 0.8 | 27 | 1.1E−07 |
| 25 | A-1 | 100 | 350 | 0.8 | 27 | 5.5E−08 |
| 26 | A-1 | 84 | 350 | 0.8 | 27 | 5.5E−08 |
| 27 | A-1 | 120 | 350 | 1.5 | 27 | 5.5E−08 |
| 28 | A-1 | 100 | 350 | 1.5 | 27 | 2.8E−08 |
| 29 | A-1 | 80 | 350 | 1.5 | 27 | 2.8E−08 |
| 30 | A-1 | 70 | 350 | 0.3 | 27 | 7.7E−08 |
| 31 | A-1 | 70 | 350 | 1.0 | 27 | 3.3E−08 |
| 32 | A-1 | 70 | 350 | 2.0 | 27 | 2.8E−08 |
| 33 | A-1 | 70 | 350 | 3.0 | 27 | 1.7E−08 |
| 34 | A-1 | 70 | 350 | 1.0 | 6 | 2.1E−08 |
| 35 | A-1 | 70 | 350 | 4.0 | 6 | 4.1E−08 |
| 36 | A-1 | 70 | 350 | 2.0 | 6 | 4.1E−08 |
| 37 | A-1 | 70 | 350 | 1.0 | 6 | 4.1E−08 |
| 38 | A-1 | 70 | 350 | 0.2 | 27 | 7.2E−08 |
| 39 | A-1 | 100 | 350 | 0.5 | 27 | 5.5E−07 |
| 40 | A-1 | 80 | 350 | 0.5 | 27 | 6.6E−08 |
| 41 | A-1 | 100 | 350 | 0.7 | 27 | 1.4E−07 |
| 42 | A-1 | 100 | 350 | 0.5 | 27 | 1.4E−07 |
| 43 | A-1 | 86 | 350 | 0.5 | 27 | 6.9E−08 |
| 44 | A-1 | 100 | 350 | 0.5 | 27 | 6.9E−08 |
| 45 | A-1 | 80 | 350 | 0.5 | 27 | 6.9E−08 |
| 46 | A-1 | 100 | 350 | 0.5 | 27 | 5.2E−08 |
| 47 | A-1 | 80 | 350 | 0.5 | 27 | 5.2E−08 |
| 48 | A-1 | 100 | 350 | 0.7 | 27 | 4.8E−08 |
| 49 | A-1 | 80 | 350 | 0.7 | 27 | 4.8E−08 |
| 50 | A-1 | 60 | 350 | 0.7 | 27 | 4.8E−08 |

Ethylene-propylene polymerization runs conditions in small reactor.

| Ex# | Polymer made (g) | Polymer Rate (g/min) | Cat eff. (g/g) | Conversion (%) |
|---|---|---|---|---|
| 18 | 530 | 13.3 | 317,879 | 48 |
| 19 | 333 | 8.3 | 599,223 | 30 |
| 20 | 238 | 6.0 | 476,372 | 22 |
| 21 | 426 | 10.6 | 589,381 | 38 |
| 22 | 411 | 10.3 | 738,904 | 37 |
| 23 | 86 | 2.2 | 387,396 | 8 |
| 24 | 133 | 3.3 | 74,561 | 12 |
| 25 | 445 | 11.1 | 500,871 | 40 |
| 26 | 452 | 11.3 | 508,746 | 41 |
| 27 | 115 | 2.9 | 128,818 | 10 |
| 28 | 246 | 6.2 | 553,423 | 21 |
| 29 | 350 | 8.7 | 786,940 | 31 |
| 30 | 398 | 9.9 | 319,505 | 36 |
| 31 | 347 | 8.7 | 650,316 | 31 |
| 32 | 323 | 8.1 | 727,323 | 28 |
| 33 | 327 | 8.2 | 1,227,500 | 27 |
| 34 | 85 | 2.1 | 254,726 | 30 |
| 35 | 308 | 7.7 | 462,535 | 73 |
| 36 | 221 | 5.5 | 330,854 | 67 |
| 37 | 172 | 4.3 | 257,514 | 60 |
| 38 | 169 | 4.2 | 145,805 | 16 |
| 39 | 885 | | 99,600 | 80 |
| 40 | 435 | 10.9 | 407,699 | 39 |
| 41 | 702 | 17.5 | 315,766 | 63 |
| 42 | 584 | 14.6 | 262,628 | 53 |
| 43 | 555 | 13.9 | 499,683 | 50 |
| 44 | 466 | 11.7 | 419,582 | 42 |
| 45 | 541 | 13.5 | 487,263 | 49 |
| 46 | 283 | 7.1 | 339,482 | 26 |
| 47 | 334 | 8.4 | 400,802 | 30 |
| 48 | 387 | 9.7 | 498,068 | 35 |
| 49 | 220 | 5.5 | 282,461 | 20 |
| 50 | 138 | 3.5 | 177,808 | 12 |

*Reactor pressure was 350 psig and the scavenger, tri-n-octylaluminum, was 1.372E−06 mol/ml in isohexane, with a feed rate between 1 to 5 ml/min used to optimize catalyst efficiency.

TABLE 3

Ethylene-propylene polymer properties. GPC is by GPC 3D as previously described

| EX # | Mn (DRI) | Mw (DRI) | Mz (DRI) | Mn (LS) | Mw (LS) | Mz (LS) | Mw(LS)/ Mn(LS) | g' (vis) |
|---|---|---|---|---|---|---|---|---|
| 1 | 84060 | 173859 | 289821 | 85213 | 156776 | 253253 | 1.84 | 1.10 |
| 2 | 70186 | 161624 | 281264 | 74279 | 142803 | 229522 | 1.92 | 1.10 |
| 3 | 60756 | 139649 | 238615 | 65491 | 120702 | 191028 | 1.84 | 1.09 |
| 4 | 46218 | 100684 | 167301 | 46319 | 85811 | 139175 | 1.85 | 1.10 |
| 5 | 38748 | 81055 | 133012 | 41526 | 70401 | 107881 | 1.70 | 1.07 |
| 6 | 35267 | 64926 | 100561 | 33077 | 57213 | 90529 | 1.73 | 1.09 |
| 17 | 82424 | 173357 | 294320 | 84474 | 158901 | 252324 | 1.88 | 1.11 |
| 18 | 58728 | 112243 | 187669 | 62230 | 108351 | 188338 | 1.74 | 1.10 |
| 19 | 137531 | 273762 | 455103 | 135728 | 245536 | 373776 | 1.81 | 1.15 |
| 20 | 327163 | 635093 | 1019703 | 339873 | 559922 | 806926 | 1.65 | 1.18 |
| 21 | 55358 | 127636 | 231698 | 47999 | 110750 | 191482 | 2.31 | 1.09 |
| 22 | 145622 | 304265 | 526148 | 143474 | 262564 | 397723 | 1.83 | 1.12 |
| 23 | 151573 | 306348 | 522240 | 151700 | 263795 | 409493 | 1.74 | 1.17 |
| 24 | 36992 | 104589 | 368623 | 40598 | 88422 | 243954 | 2.18 | 1.03 |
| 25 | 93743 | 205805 | 384454 | 95883 | 176406 | 284501 | 1.84 | 1.08 |
| 26 | 180264 | 378399 | 665005 | 181724 | 314417 | 462878 | 1.73 | 1.13 |
| 27 | 41032 | 127245 | 423533 | 40174 | 110825 | 348267 | 2.76 | 1.08 |
| 28 | 98776 | 218078 | 391484 | 100996 | 197619 | 342390 | 1.96 | 1.10 |
| 29 | 175194 | 380172 | 660865 | 171993 | 316929 | 467304 | 1.84 | 1.13 |
| 30 | 228441 | 463104 | 857923 | 246086 | 415585 | 616889 | 1.69 | 1.12 |
| 31 | 157807 | 326922 | 553090 | 160057 | 291899 | 428540 | 1.82 | 1.09 |
| 32 | 191110 | 373270 | 613906 | 209802 | 349831 | 503590 | 1.67 | 1.10 |
| 33 | 188355 | 358070 | 576165 | 213958 | 352040 | 523810 | 1.65 | 1.09 |
| 34 | 119192 | 236520 | 384111 | 122435 | 212084 | 311705 | 1.73 | 1.08 |
| 35 | 65187 | 116815 | 182093 | 71352 | 110140 | 166204 | 1.54 | 1.04 |
| 36 | 69261 | 129327 | 207750 | 72037 | 116859 | 171667 | 1.62 | 1.03 |
| 37 | 66717 | 138036 | 230899 | 70166 | 121884 | 178625 | 1.74 | 1.04 |
| 38 | | | | | | | | |
| 39 | 38550 | 83847 | 149720 | 44738 | 88143 | 189101 | 1.97 | 1.07 |
| 40 | 127221 | 270149 | 461778 | 122444 | 242618 | 391858 | 1.98 | 1.14 |
| 41 | 48274 | 114359 | 221089 | 44022 | 104579 | 225249 | 2.38 | 1.07 |
| 42 | 52735 | 116857 | 217730 | 48022 | 100394 | 168739 | 2.09 | 1.10 |
| 43 | 99674 | 211623 | 375829 | 102766 | 185824 | 299398 | 1.81 | 1.11 |
| 44 | 59568 | 120958 | 218387 | 59699 | 105048 | 167248 | 1.76 | 1.09 |
| 45 | 118207 | 238051 | 412393 | 119158 | 212110 | 339158 | 1.78 | 1.11 |
| 46 | 64426 | 126384 | 209922 | 68142 | 116474 | 190576 | 1.71 | 1.09 |
| 47 | 137008 | 270586 | 438307 | 136770 | 248513 | 382865 | 1.82 | 1.15 |
| 48 | 64536 | 121503 | 193797 | 71903 | 123873 | 213549 | 1.72 | 1.10 |
| 49 | 142387 | 283018 | 454774 | 139173 | 256854 | 384887 | 1.85 | 1.14 |
| 50 | | | | | | | | |

TABLE 4

Ethylene-propylene polymer properties. GPC is by GPC 4D as previously described

| EX # | Mn (IR) | Mw (IR) | Mz (IR) | Mn (LS) | Mw (LS) | Mz (LS) | Mw(LS)/ Mn(LS) | g' (vis) |
|---|---|---|---|---|---|---|---|---|
| 7 | 47058 | 128675 | 253582 | 48958 | 131479 | 245133 | 2.69 | 1.00 |
| 8 | 35284 | 99602 | 200127 | 37314 | 103097 | 198765 | 2.76 | 0.99 |
| 9 | 25662 | 72830 | 146883 | 25891 | 76375 | 155755 | 2.95 | 0.97 |
| 10 | 20286 | 54167 | 102283 | 21268 | 56359 | 105563 | 2.65 | 0.97 |
| 11 | 14646 | 39585 | 71629 | 14918 | 40868 | 74680 | 2.74 | 1.01 |
| 12 | 17828 | 40856 | 71125 | 18645 | 42693 | 72923 | 2.29 | 1.00 |
| 13 | 24958 | 58400 | 102950 | 25243 | 59346 | 103675 | 2.35 | 1.02 |
| 14 | 29615 | 71636 | 128422 | 30057 | 72645 | 128753 | 2.42 | 1.04 |
| 15 | 34752 | 92629 | 174368 | 36840 | 93722 | 170769 | 2.54 | 1.03 |
| 16 | 42408 | 112468 | 212098 | 42714 | 113449 | 207351 | 2.66 | 1.03 |
| 17 | 70368 | 157750 | 270474 | 71777 | 163724 | 268843 | 2.28 | 1.07 |

TABLE 5

Additional ethylene-propylene polymer properties.

| Ex# | C2 (wt. % by FTIR) | C2 (mole fraction by $^{13}$C NMR) | C2 (wt. % by $^{13}$C NMR) | C3 (wt. % by $^{13}$C NMR) | r1r2 by $^{13}$C NMR | % regio defects by $^{13}$C NMR |
|---|---|---|---|---|---|---|
| 1 | 12.1 | | | | | |
| 2 | 6.7 | | | | | |
| 3 | 7.3 | 0.12 | 8.5 | 91.5 | 2.09 | 2.70 |
| 4 | 7.5 | 0.12 | 8.5 | 91.5 | 1.91 | 2.66 |
| 5 | 7.6 | 0.12 | 8.5 | 91.5 | 1.98 | 2.52 |
| 6 | 7.8 | 0.12 | 8.6 | 91.4 | 1.89 | 2.58 |
| 7 | 35.1 | 0.43 | 33.9 | 66.1 | 1.34 | 3.23 |
| 8 | 36.0 | 0.45 | 35.2 | 64.8 | 1.33 | 3.08 |
| 9 | 36.3 | 0.46 | 36.6 | 63.4 | 1.28 | 3.17 |
| 10 | 36.6 | 0.47 | 36.9 | 63.1 | 1.31 | 2.64 |
| 11 | 20.9 | 0.28 | 20.8 | 79.2 | 1.34 | 3.28 |
| 12 | 20.0 | 0.28 | 20.5 | 79.5 | 1.37 | 3.32 |
| 13 | 19.6 | 0.28 | 20.8 | 79.2 | 1.36 | 3.65 |
| 14 | 20.2 | 0.29 | 21.3 | 78.7 | 1.34 | 3.58 |
| 15 | 19.8 | 0.28 | 20.5 | 79.5 | 1.32 | 3.44 |
| 16 | 20.4 | 0.28 | 20.3 | 79.7 | 1.39 | 3.48 |
| 17 | 5.7 | 0.11 | 7.6 | 92.4 | 2.46 | 3.17 |
| 18 | 4.1 | 0.07 | 4.9 | 95.1 | 3.05 | 3.09 |
| 19 | 3.5 | 0.08 | 5.3 | 94.7 | 3.55 | 2.75 |
| 20 | 4.0 | 0.07 | 4.8 | 95.2 | 2.65 | 2.27 |
| 21 | 5.1 | 0.09 | 6.4 | 93.6 | 2.32 | 3.26 |

TABLE 5-continued

Additional ethylene-propylene polymer properties.

| Ex# | C2 (wt. % by FTIR) | C2 (mole fraction by $^{13}$C NMR) | C2 (wt. %) by $^{13}$C NMR) | C3 (wt. %) by $^{13}$C NMR) | r1r2 by $^{13}$C NMR | % regio defects by $^{13}$C NMR |
|---|---|---|---|---|---|---|
| 22 | 5.3 | 0.09 | 6.2 | 93.8 | 2.69 | 2.85 |
| 23 | 5.7 | 0.11 | 7.7 | 92.3 | 2.77 | 2.51 |
| 24 | 7.8 | 0.11 | 7.9 | 92.1 | 1.60 | 3.23 |
| 25 | 6.1 | 0.11 | 7.6 | 92.4 | 2.27 | 3.12 |
| 26 | 5.4 | 0.11 | 7.3 | 92.7 | 2.00 | 2.64 |
| 27 | 11.3 | 0.17 | 12.0 | 88.0 | 1.57 | 3.25 |
| 28 | 11.5 | 0.17 | 12.0 | 88.0 | 1.50 | 2.86 |
| 29 | 10.1 | 0.15 | 10.5 | 89.5 | 1.81 | 2.22 |
| 30 | 5.3 | 0.07 | 4.6 | 95.4 | 8.74 | 2.40 |
| 31 | 10.1 | 0.13 | 9.0 | 91.0 | 2.48 | 2.69 |
| 32 | 14.3 | 0.20 | 14.3 | 85.7 | 1.69 | 2.26 |
| 33 | 19.4 | 0.26 | 19.4 | 80.6 | 1.49 | 1.92 |
| 34 | 24.7 | 0.34 | 25.9 | 74.1 | 1.46 | 1.91 |
| 35 | 45.7 | 0.58 | 48.0 | 52.0 | 1.28 | 1.05 |
| 36 | 31.9 | 0.42 | 32.2 | 67.8 | 1.37 | 1.61 |
| 37 | 21.7 | 0.29 | 21.1 | 78.9 | 1.46 | 1.96 |
| 38 | 2.6 | | | | | |
| 39 | 4.0 | | | | | |
| 40 | 3.6 | | | | | |
| 41 | 4.4 | | | | | |
| 42 | 3.0 | | | | | |
| 43 | 2.9 | | | | | |
| 44 | 3.6 | | | | | |
| 45 | 3.7 | | | | | |
| 46 | 6.6 | | | | | |
| 47 | 4.9 | | | | | |
| 48 | 7.7 | | | | | |
| 49 | 6.5 | | | | | |
| 50 | 5.9 | | | | | |

TABLE 6

Ethylene-propylene polymer properties. No melting and crystallization events were found in DSC testing. * Ex #29 did not show any melting and crystallization events after the DSC experiment and subsequently aging at room temperature for 10 weeks as measured from the first heating cycle.

| Ex# | Tg (° C.) | MFR$_{2.16}$ (g/10 min) | MFR$_{21.6}$ (g/10 min) | ML* (mu) | MLRA* (mu-sec) |
|---|---|---|---|---|---|
| 1 | | 4.9 | | 17 | 23 |
| 2 | | 8.8 | | 12 | 18 |
| 3 | | 13.4 | | 8 | 9 |
| 4 | | 75.8 | | | |
| 5 | | 146.9 | | | |
| 6 | | 354.4 | | | |
| 7 | −45.8 | 2.8 | | | |
| 8 | −45.2 | 8.1 | | | |
| 9 | −46.0 | 31.9 | | | |
| 10 | −47.9 | 89.5 | | | |
| 11 | −29.9 | | | | |
| 12 | −30.9 | 889.2 | | | |
| 13 | −29.0 | 231.8 | | | |
| 14 | −28.3 | 90.3 | | | |
| 15 | −29.4 | 32.4 | | | |
| 16 | −28.3 | 15.9 | | | |
| 17 | −9.7 | 7.8 | | 14 | |
| 18 | −8.9 | 69.0 | | 3 | 1 |
| 19 | −8.3 | 3.9 | | 25 | 56 |
| 20 | −6.3 | 0.3 | 14.4 | 92 | 1557 |
| 21 | −9.3 | 38.6 | | 4 | 2 |
| 22 | −9.7 | 2.1 | | 37 | 78 |
| 23 | −10.3 | 1.5 | 24.3 | | |
| 24 | −13.1 | 126.6 | | 1 | 0 |
| 25 | −11.7 | 5.4 | | 16 | 27 |
| 26 | −10.2 | 0.5 | | 78 | 395 |
| 27 | −18.6 | 44.5 | | 4 | 6 |
| 28 | −18.6 | 4.9 | | 23 | 36 |
| 29* | −16.0 | 1.8 | | 101 | 601 |
| 30 | | | 28.1 | | |
| 21 | | | 47.5 | | |
| 32 | | | 31.4 | | |
| 33 | | | 22.2 | | |
| 34 | | 1.4 | | | |
| 35 | | 7.1 | | | |
| 36 | | 10.7 | | | |
| 37 | | 15.7 | | | |
| 38 | | 0.5 | | | |
| 39 | −10.9 | 360.5 | | | |
| 40 | −9.2 | 2.3 | | | |
| 41 | −9.2 | 80.0 | | | |
| 42 | −8.4 | 66.5 | | | |
| 43 | −7.9 | 6.9 | | | |
| 44 | −10.1 | 62.2 | | | |
| 45 | −9.0 | 3.7 | | | |
| 46 | −12.8 | 48.9 | | | |
| 47 | −10.0 | 2.2 | | | |
| 48 | −14.0 | 37.6 | | | |
| 49 | −12.2 | 2.3 | | | |
| 50 | −11.4 | 0.3 | | | |

*ASTM D1646-17 ((1 + 4), 125° C., 2 s$^{-1}$ shear rate)

TABLE 7

Ethylene-propylene polymer properties measured by $^{13}$C NMR where EEE, EEP, PEP, EPE EPP and PPP are the sequence distribution of ethylene, E, and propylene, P, monomers reported as mole fractions.

| ex# | % rr (PP + EP) | C2 (mol fraction) | C2 (wt %) | C3 (wt %) | r1r2 | EEE | EEP | PEP | EPE | EPP | PPP | % regio defect | ave CH2 sequence length > 6 |
|---|---|---|---|---|---|---|---|---|---|---|---|---|---|
| 3 | 41.0 | 0.12 | 8.5 | 91.5 | 2.09 | 0.01 | 0.02 | 0.07 | 0.01 | 0.15 | 0.75 | 2.7 | 8.8 |
| 4 | 40.8 | 0.12 | 8.5 | 91.5 | 1.91 | 0.00 | 0.02 | 0.07 | 0.01 | 0.14 | 0.75 | 2.7 | 7.8 |
| 5 | 41.1 | 0.12 | 8.5 | 91.5 | 1.98 | 0.01 | 0.02 | 0.07 | 0.01 | 0.15 | 0.75 | 2.5 | 8.4 |
| 6 | 40.9 | 0.12 | 8.6 | 91.4 | 1.89 | 0.01 | 0.02 | 0.07 | 0.01 | 0.15 | 0.75 | 2.6 | 8.2 |
| 7 | | 0.43 | 33.9 | 66.1 | 1.34 | 0.10 | 0.19 | 0.12 | 0.10 | 0.27 | 0.22 | 3.2 | 9.0 |
| 8 | | 0.45 | 35.2 | 64.8 | 1.33 | 0.10 | 0.21 | 0.12 | 0.11 | 0.25 | 0.21 | 3.1 | 8.9 |
| 9 | | 0.46 | 36.6 | 63.4 | 1.28 | 0.11 | 0.21 | 0.13 | 0.11 | 0.25 | 0.19 | 3.2 | 9.0 |
| 10 | | 0.47 | 36.9 | 63.1 | 1.31 | 0.12 | 0.22 | 0.12 | 0.11 | 0.24 | 0.19 | 2.6 | 9.0 |
| 11 | | 0.28 | 20.8 | 79.2 | 1.34 | 0.03 | 0.10 | 0.13 | 0.05 | 0.26 | 0.43 | 3.3 | 8.1 |
| 12 | | 0.28 | 20.5 | 79.5 | 1.37 | 0.03 | 0.10 | 0.13 | 0.05 | 0.25 | 0.44 | 3.3 | 8.0 |

TABLE 7-continued

Ethylene-propylene polymer properties measured by $^{13}$C NMR where EEE, EEP, PEP, EPE EPP and PPP are the sequence distribution of ethylene, E, and propylene, P, monomers reported as mole fractions.

| ex# | % rr (PP + EP) | C2 (mol fraction) | C2 (wt %) | C3 (wt %) | r1r2 | EEE | EEP | PEP | EPE | EPP | PPP | % regio defect | ave CH2 sequence length > 6 |
|---|---|---|---|---|---|---|---|---|---|---|---|---|---|
| 13 |  | 0.28 | 20.8 | 79.2 | 1.36 | 0.03 | 0.10 | 0.13 | 0.05 | 0.25 | 0.44 | 3.6 | 8.0 |
| 14 |  | 0.29 | 21.3 | 78.7 | 1.34 | 0.03 | 0.10 | 0.13 | 0.06 | 0.25 | 0.43 | 3.6 | 7.9 |
| 15 |  | 0.28 | 20.5 | 79.5 | 1.32 | 0.02 | 0.10 | 0.13 | 0.05 | 0.25 | 0.44 | 3.4 | 7.8 |
| 16 |  | 0.28 | 20.3 | 79.7 | 1.39 | 0.03 | 0.10 | 0.13 | 0.05 | 0.25 | 0.45 | 3.5 | 8.0 |
| 17 |  | 0.11 | 7.6 | 92.4 | 2.46 | 0.00 | 0.02 | 0.05 | 0.01 | 0.12 | 0.80 | 3.2 | 7.3 |
| 18 | 38.8 | 0.07 | 4.9 | 95.1 | 3.05 | 0.00 | 0.01 | 0.03 | 0.00 | 0.07 | 0.89 | 3.1 | 6.9 |
| 19 | 40.1 | 0.08 | 5.3 | 94.7 | 3.55 | 0.00 | 0.01 | 0.04 | 0.00 | 0.08 | 0.87 | 2.7 | 8.1 |
| 20 | 42.8 | 0.07 | 4.8 | 95.2 | 2.65 | 0.00 | 0.01 | 0.03 | 0.00 | 0.08 | 0.87 | 2.3 | 6.3 |
| 21 | 40.0 | 0.09 | 6.4 | 93.6 | 2.32 | 0.00 | 0.01 | 0.05 | 0.00 | 0.10 | 0.84 | 3.3 | 7.5 |
| 22 | 41.1 | 0.09 | 6.2 | 93.8 | 2.69 | 0.00 | 0.01 | 0.05 | 0.00 | 0.10 | 0.84 | 2.9 | 7.5 |
| 23 | 43.9 | 0.11 | 7.7 | 92.3 | 2.77 | 0.01 | 0.02 | 0.06 | 0.01 | 0.12 | 0.79 | 2.5 | 8.4 |
| 24 |  | 0.11 | 7.9 | 92.1 | 1.60 | 0.00 | 0.01 | 0.06 | 0.01 | 0.14 | 0.77 | 3.2 | 7.3 |
| 25 |  | 0.11 | 7.6 | 92.4 | 2.27 | 0.00 | 0.02 | 0.05 | 0.01 | 0.12 | 0.80 | 3.1 | 8.1 |
| 26 |  | 0.11 | 7.3 | 92.7 | 2.00 | 0.00 | 0.01 | 0.06 | 0.02 | 0.12 | 0.79 | 2.6 | 8.0 |
| 27 |  | 0.17 | 12.0 | 88.0 | 1.57 | 0.01 | 0.04 | 0.09 | 0.02 | 0.19 | 0.65 | 3.2 | 7.4 |
| 28 |  | 0.17 | 12.0 | 88.0 | 1.50 | 0.01 | 0.04 | 0.09 | 0.02 | 0.20 | 0.64 | 2.9 | 7.7 |
| 29 |  | 0.15 | 10.5 | 89.5 | 1.81 | 0.01 | 0.03 | 0.08 | 0.02 | 0.19 | 0.67 | 2.2 | 8.3 |
| 30 |  | 0.07 | 4.6 | 95.4 |  | 0.00 | 0.01 | 0.02 | 0.01 | 0.05 | 0.91 | 2.4 | 8.7 |
| 31 |  | 0.13 | 9.0 | 91.0 | 2.48 | 0.01 | 0.02 | 0.07 | 0.01 | 0.14 | 0.76 | 2.7 | 8.5 |
| 32 |  | 0.20 | 14.3 | 85.7 | 1.69 | 0.01 | 0.06 | 0.10 | 0.03 | 0.21 | 0.59 | 2.3 | 7.8 |
| 33 |  | 0.26 | 19.4 | 80.6 | 1.49 | 0.03 | 0.10 | 0.12 | 0.05 | 0.25 | 0.45 | 1.9 | 7.9 |
| 34 |  | 0.34 | 25.9 | 74.1 | 1.46 | 0.06 | 0.14 | 0.13 | 0.07 | 0.26 | 0.34 | 1.9 | 8.9 |
| 35 |  | 0.58 | 48.0 | 52.0 | 1.28 | 0.22 | 0.26 | 0.10 | 0.14 | 0.19 | 0.10 | 1.0 | 10.7 |
| 36 |  | 0.42 | 32.2 | 67.8 | 1.37 | 0.09 | 0.19 | 0.13 | 0.10 | 0.26 | 0.24 | 1.6 | 8.9 |
| 37 |  | 0.29 | 21.1 | 78.9 | 1.46 | 0.03 | 0.11 | 0.13 | 0.05 | 0.25 | 0.42 | 2.0 | 8.1 |

All documents described herein are incorporated by reference herein, including any priority documents and/or testing procedures to the extent they are not inconsistent with this text. As is apparent from the foregoing general description and the specific embodiments, while some embodiments of the present disclosure have been illustrated and described, various modifications can be made without departing from the spirit and scope of the present disclosure. Accordingly, it is not intended that embodiments of the present disclosure be limited thereby. Likewise, the term "comprising" is considered synonymous with the term "including." Likewise, whenever a composition, an element or a group of elements is preceded with the transitional phrase "comprising", it is understood that we also contemplate the same composition or group of elements with transitional phrases "consisting essentially of," "consisting of", "selected from the group consisting of," or "is" preceding the recitation of the composition, element, or elements and vice versa. Likewise, the terms "comprising," "consisting essentially of," "consisting of" also include the product of the combinations of elements listed after the term.

What is claimed is:

1. A method for producing a $C_3$-$C_{40}$ olefin-ethylene copolymer comprising:
    contacting a $C_3$-$C_{40}$ olefin and ethylene with a catalyst system comprising an activator and a catalyst compound represented by formula (I):

$$T_yCp'_mMG_nX_q \quad (I)$$

wherein: Cp' is a tetrahydroindacenyl group, wherein the tetrahydroindacenyl group tetrahydro-s-indacenyl or tetrahydro-as-indacenyl, and wherein the tetrahydroindacenyl group is optionally substituted or unsubstituted, provided that when Cp' is tetrahydro-s-indacenyl: 1) the 3 and/or 4 positions are not aryl or substituted aryl, 2) the 3 position is not directly bonded to a group 15 or 16 heteroatom, 3) there are no additional rings fused to the tetrahydroindacenyl ligand, 4) T is not bonded to the 2-position, and 5) the 5, 6, or 7-position is geminally disubstituted;

M is a group 3, 4, 5, or 6 transition metal;

T is a bridging group;

y is 0 or 1, indicating the absence or presence of T;

G is a heteroatom group represented by the formula $JR^i_{z-y}$, where J is N, P, O or S, $R^i$ is a $C_1$ to $C_{100}$ hydrocarbyl group, and z is 2 when J is N or P, and z is 1 when J is O or S;

X is a leaving group;

m=1; n=1, 2 or 3; q=1, 2 or 3; and the sum of m+n+q is equal to the oxidation state of the transition metal; and obtaining the a $C_3$-$C_{40}$ olefin-ethylene copolymer comprising from 0.5 to 43 wt % of ethylene, and from 99.5 to 57 wt % $C_3$-$C_{40}$ olefin, and wherein the copolymer has a $T_g$ (° C.) is from 0 to −60° C.

2. The method of claim 1, wherein the catalyst compound is represented

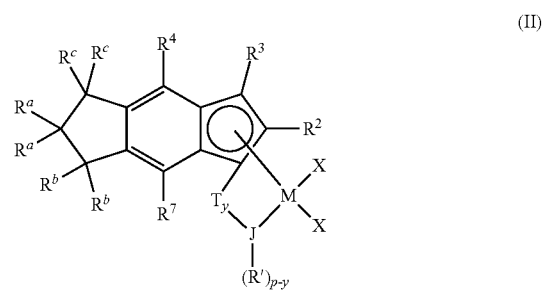

by formula (II):
where M is a group 4 metal;
J is N, O, S or P;
p is 2 when J is N or P, and is 1 when J is O or S;
each $R^a$ is independently $C_1$-$C_{10}$ alkyl;
each $R^b$ and each $R^c$ is independently hydrogen or a $C_1$-$C_{10}$ alkyl;
each $R^2$, $R^3$, $R^4$, and $R^7$ is independently hydrogen, or a $C_1$-$C_{50}$ substituted or unsubstituted hydrocarbyl, halocarbyl, silylcarbyl or germylcarbyl, provided that: 1) $R^3$ and/or $R^4$ are not aryl or substituted aryl, 2) $R^3$ is not directly bonded to a group 15 or 16 heteroatom, and 3) adjacent $R^4$, $R^c$, $R^b$, $R^a$, or $R^7$ do not join together to form a fused ring system;
each R' is independently a $C_1$-$C_{100}$ substituted or unsubstituted hydrocarbyl, halocarbyl, silylcarbyl or germylcarbyl;
T is a bridging group and y is 0 or 1 indicating the absence (y=0) or presence (y=1) of T;
each X is, independently, a leaving group, or two Xs are joined and bound to the metal atom to form a metallocycle ring, or two Xs are joined to form a chelating ligand, a diene ligand, or an alkylidene.

3. The method of claim 2, wherein both $R^a$ are methyl and all $R^b$ and $R^c$ are hydrogen.

4. The method of claim 2, wherein $R^2$ is methyl, ethyl, propyl, butyl, pentyl, hexyl, heptyl, octyl, nonyl, decyl, undecyl, dodecyl or an isomer thereof and $R^3$, $R^4$, and $R^7$ are hydrogen.

5. The method of claim 1, wherein the catalyst compound is represented by formula (III):

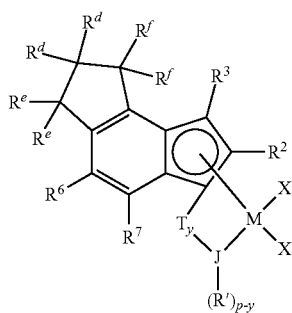

(III)

where M is a group 4 metal;
J is N, O, S or P;
p is 2 when J is N or P, and is 1 when J is O or S;
each $R^d$, $R^e$ and $R^f$ is independently hydrogen or a $C_1$-$C_{10}$ alkyl;
each $R^2$, $R^3$, $R^6$, and $R^7$ is independently hydrogen, or a $C_1$-$C_{50}$ substituted or unsubstituted hydrocarbyl, halocarbyl, silylcarbyl or germylcarbyl;
each R' is, independently, a $C_1$-$C_{100}$ substituted or unsubstituted hydrocarbyl, halocarbyl, silylcarbyl or germylcarbyl;
T is a bridging group and y is 0 or 1 indicating the absence (y=0) or presence (y=1) of T;
each X is independently a leaving group, or two Xs are joined and bound to the metal atom to form a metallocycle ring, or two Xs are joined to form a chelating ligand, a diene ligand, or an alkylidene.

6. The method of claim 5, wherein both $R^d$ are methyl and all $R^e$ and $R^f$ are hydrogen.

7. The method of claim 5, wherein $R^2$ is methyl, ethyl, propyl, butyl, pentyl, hexyl, heptyl, octyl, nonyl, decyl, undecyl, dodecyl or an isomer thereof and $R^3$, $R^6$, and $R^7$ are hydrogen.

8. The method of claim 2, wherein $R^2$ is methyl.

9. The method of claim 2, wherein y is 1 and T is $(CR^8R^9)_x$, $SiR^8R^9$, or $GeR^8R^9$ where x is 1 or 2, and $R^8$ and $R^9$ are independently selected from hydrogen or substituted or unsubstituted hydrocarbyl, halocarbyl, silylcarbyl and germylcarbyl and $R^8$ and $R^9$ may optionally be bonded together to form a ring structure.

10. The method of claim 5, wherein y is 1 and T is $(CR^8R^9)_x$, $SiR^8R^9$, or $GeR^8R^9$ where x is 1 or 2, and $R^8$ and $R^9$ are independently selected from hydrogen or substituted or unsubstituted hydrocarbyl, halocarbyl, silylcarbyl and germylcarbyl and $R^8$ and $R^9$ may optionally be bonded together to form a ring structure.

11. The method of claim 1, wherein each X is, independently, selected from hydrocarbyl radicals having from 1 to 20 carbon atoms, aryls, hydrides, amides, alkoxides, sulfides, phosphides, halides, amines, phosphines, ethers, or a combination thereof, and wherein two X's optionally form a part of a metallocycle ring, or two X's are joined to form a chelating ligand, diene ligand or alkylidene.

12. The method of claim 1, wherein each X is independently selected from halides, aryls or $C_1$ to $C_5$ alkyl groups.

13. The method of claim 1, wherein the catalyst compound is one or more of:
dimethylsilylene(2,6,6-trimethyl-1,5,6,7-tetrahydro-s-indacen-1-yl)(t-butylamido)M(R)$_2$;
dimethylsilylene(6,6-dimethyl-1,5,6,7-tetrahydro-s-indacen-1-yl)(t-butylamido)M(R)$_2$;
dimethylsilylene(2,7,7-trimethyl-3,6,7,8-tetrahydro-as-indacen-3-yl)(t-butylamido)M(R)$_2$;
dimethylsilylene(7,7-dimethyl-3,6,7,8-tetrahydro-as-indacen-3-yl)(t-butylamido)M(R)$_2$;
dimethylsilylene(2,6,6-trimethyl-1,5,6,7-tetrahydro-s-indacen-1-yl)(cyclododecylamido)M(R)$_2$;
dimethylsilylene(6,6-dimethyl-1,5,6,7-tetrahydro-s-indacen-1-yl)(cyclododecylamido)M(R)$_2$;
dimethylsilylene(2,7,7-trimethyl-3,6,7,8-tetrahydro-as-indacen-3-yl)(cyclododecylamido)M(R)$_2$;
dimethylsilylene(7,7-dimethyl-3,6,7,8-tetrahydro-as-indacen-3-yl)(cyclododecylamido)M(R)$_2$;
dimethylsilylene(2,6,6-trimethyl-1,5,6,7-tetrahydro-s-indacen-1-yl)(cyclohexylamido)M(R)$_2$;
dimethylsilylene(6,6-dimethyl-1,5,6,7-tetrahydro-s-indacen-1-yl)(cyclohexylamido)M(R)$_2$;
dimethylsilylene(2,7,7-trimethyl-3,6,7,8-tetrahydro-as-indacen-3-yl)(cyclohexylamido)M(R)$_2$;
dimethylsilylene(7,7-dimethyl-3,6,7,8-tetrahydro-as-indacen-3-yl)(cyclohexylamido)M(R)$_2$;
dimethylsilylene(2,6,6-trimethyl-1,5,6,7-tetrahydro-s-indacen-1-yl)(adamantylamido)M(R)$_2$;
dimethylsilylene(6,6-dimethyl-1,5,6,7-tetrahydro-s-indacen-1-yl)(adamantylamido)M(R)$_2$;
dimethylsilylene(2,7,7-trimethyl-3,6,7,8-tetrahydro-as-indacen-3-yl)(adamantylamido)M(R)$_2$;
dimethylsilylene(7,7-dimethyl-3,6,7,8-tetrahydro-as-indacen-3-yl)(adamantylamido)M(R)$_2$;
dimethylsilylene(2,6,6-trimethyl-1,5,6,7-tetrahydro-s-indacen-1-yl)(neopentylamido)M(R)$_2$;
dimethylsilylene(6,6-dimethyl-1,5,6,7-tetrahydro-s-indacen-1-yl)(neopentylamido)M(R)$_2$;
dimethylsilylene(2,7,7-trimethyl-3,6,7,8-tetrahydro-as-indacen-3-yl)(neopentylamido)M(R)$_2$;

dimethylsilylene(7,7-dimethyl-3,6,7,8-tetrahydro-as-indacen-3-yl)(neopentylamido)M(R)$_2$;
dimethylsilylene(2-methyl-6,6-diethyl-1,5,6,7-tetrahydro-s-indacen-1-yl)(t-butylamido)M(R)$_2$;
dimethylsilylene(6,6-diethyl-1,5,6,7-tetrahydro-s-indacen-1-yl)(t-butylamido)M(R)$_2$;
dimethylsilylene(2-methyl-7,7-diethyl-3,6,7,8-tetrahydro-as-indacen-3-yl)(t-butylamido)M(R)$_2$;
dimethylsilylene(7,7-diethyl-3,6,7,8-tetrahydro-as-indacen-3-yl)(t-butylamido)M(R)$_2$;
dimethylsilylene(2-methyl-6,6-diethyl-1,5,6,7-tetrahydro-s-indacen-1-yl)(cyclododecylamido)M(R)$_2$;
dimethylsilylene(6,6-diethyl-1,5,6,7-tetrahydro-s-indacen-1-yl)(cyclododecylamido)M(R)$_2$;
dimethylsilylene(2-methyl-7,7-diethyl-3,6,7,8-tetrahydro-as-indacen-3-yl)(cyclododecylamido)M(R)$_2$;
dimethylsilylene(7,7-dimethyl-3,6,7,8-tetrahydro-as-indacen-3-yl)(cyclododecylamido)M(R)$_2$;
diethylsilylene(2,6,6-trimethyl-1,5,6,7-tetrahydro-s-indacen-1-yl)(t-butylamido)M(R)$_2$;
diethylsilylene(6,6-dimethyl-1,5,6,7-tetrahydro-s-indacen-1-yl)(t-butylamido)M(R)$_2$;
diethylsilylene(2,7,7-trimethyl-3,6,7,8-tetrahydro-as-indacen-3-yl)(t-butylamido)M(R)$_2$;
diethylsilylene(7,7-dimethyl-3,6,7,8-tetrahydro-as-indacen-3-yl)(t-butylamido)M(R)$_2$;
dimethylsilylene(2-methyl-3,6,7,8-tetrahydro-as-indacen-3-yl)(cyclohexylamido)M(R)$_2$;
dimethylsilylene(2-methyl-3,6,7,8-tetrahydro-as-indacen-3-yl)(cyclododecylamido)M(R)$_2$;
dimethylsilylene(2-methyl-3,6,7,8-tetrahydro-as-indacen-3-yl)(adamantylamido)M(R)$_2$; and
dimethylsilylene(2-methyl-3,6,7,8-tetrahydro-as-indacen-3-yl)(t-butylamido)M(R)$_2$;

where M is selected from a group consisting of Ti, Zr, and Hf and R is selected from halogen and $C_1$ to $C_5$ alkyl.

14. The method of claim 1, wherein the $C_3$-$C_{40}$ olefin is a $C_3$-$C_{20}$ α-olefin selected from propylene, 1-butene, 1-pentene, 1-hexene, 1-heptene, 1-octene, 1-nonene, 1-decene, 1-undecene, or 1-dodecene.

15. The method of claim 1, wherein the $C_3$-$C_{40}$ olefin-ethylene copolymer has:
1) a melt flow rate at 230° C. from 0.2 g/10 min to 2000 g/10 min at 2.16 kg;
2) a number average molecular weight value of from 10,000 g/mol to 500,000 g/mol;
3) a weight average molecular weight value of from 20,000 g/mol to 1,000,000 g/mol;
4) a z-average molecular weight value of from 50,000 g/mol to 2,000,000 g/mol;
5) an Mw/Mn of from 1.5 to 3.5; and
6) a crystallinity of from 0% to 3%.

16. The method of claim 1, wherein the $C_3$-$C_{40}$ olefin-ethylene copolymer has a g'(vis) value of 0.90 or greater.

17. The method of claim 1, wherein the $T_g$ (° C.) of the $C_3$-$C_{40}$ olefin-ethylene copolymer is greater than or equal to $-8.4295-1.2019*E$ and less than or equal to $0.5705-1.2019*E$, wherein E is weight fraction of ethylene in the $C_3$-$C_{40}$ olefin-ethylene copolymer measured by FTIR.

18. The method of claim 1, wherein a [PPP] mole fraction is greater than $1-0.0296*x+0.0000658*x^2+0.00000349*x^3-0.10$ and less than $1-0.0296*x+0.0000658*x^2+0.00000349*x^3+0.10$ where x is a wt % of ethylene as measured by $^{13}C$ NMR.

19. The method of claim 1, wherein a [EEP] mole fraction is greater than $0.0067*x-0.050$ where x is a wt % of ethylene as measured by $^{13}C$ NMR.

20. A polymer comprising:
from 0.5 to 43 wt % of ethylene and from 99.5 to 57 wt % $C_3$-$C_{40}$ olefin, and
wherein the polymer has a $T_g$ (° C.) is from 0 to −60° C.;
optionally, wherein the polymer has an average $CH_2$ sequence length for 6$^+$carbons as measured by $^{13}C$ NMR of less than 10, or less than 9.5, or 9 or lower, with a lower limit of 4 or greater, or 5 or greater, or 6 or greater; and
wherein the polymer has:
1) a melt flow rate at 230° C. from 0.2 g/10 min to 2000 g/10 min at 2.16 kg;
2) a number average molecular weight value of from 10,000 g/mol to 500,000 g/mol;
3) a weight average molecular weight value of from 20,000 g/mol to 1,000,000 g/mol;
4) a z-average molecular weight value of from 50,000 g/mol to 2,000,000 g/mol;
5) an Mw/Mn of from 1.5 to 3.5;
6) a crystallinity of from 0% to 3%;
7) the Tg (° C.) of the polymer is greater than or equal to $-8.4295-1.2019*E$ and less than or equal to $0.5705-1.2019*E$, wherein E is a weight fraction of ethylene in the polymer measured by FTIR.

21. The polymer of claim 20, wherein the $C_3$-$C_{40}$ olefin is propylene.

22. The polymer of claim 21, wherein a [PPP] mole fraction is greater than $1-0.0296*x+0.0000658*x^2+0.00000349*x^3-0.10$ and less than $1-0.0296*x+0.0000658*x^2+0.00000349*x^3+0.10$ where x is a wt % of ethylene as measured by $^{13}C$ NMR.

23. The polymer of claim 21, wherein a [EEP] mole fraction is greater than $0.0067*x-0.050$ where x is a wt % of ethylene as measured by $^{13}C$ NMR.

24. The polymer of claim 21, wherein the propylene content is above 90 wt %, and a percent rr dyads as measured by $^{13}C$ NMR are greater than 25%.

* * * * *